United States Patent
Cromie et al.

(10) Patent No.: US 11,418,144 B1
(45) Date of Patent: Aug. 16, 2022

(54) DEPLOYABLE SOLAR PANELS FOR HIGH-ALTITUDE BALLOONS

(71) Applicant: Aerostar International, Inc., Sioux Falls, SD (US)

(72) Inventors: John Cromie, Menlo Park, CA (US); Peter Isaac Capraro, San Francisco, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 0 days.

(21) Appl. No.: 17/140,636

(22) Filed: Jan. 4, 2021

Related U.S. Application Data

(62) Division of application No. 16/209,160, filed on Dec. 4, 2018, now Pat. No. 10,917,034.

(60) Provisional application No. 62/595,188, filed on Dec. 6, 2017.

(51) Int. Cl.
  *H02S 20/30* (2014.01)
  *H02S 30/20* (2014.01)
  *B64B 1/40* (2006.01)

(52) U.S. Cl.
  CPC ............... *H02S 20/30* (2014.12); *B64B 1/40* (2013.01); *H02S 30/20* (2014.12); *B64D 2211/00* (2013.01)

(58) Field of Classification Search
  CPC .................................. H02S 20/30; H02S 30/20
  See application file for complete search history.

(56) References Cited

U.S. PATENT DOCUMENTS

| | | | |
|---|---|---|---|
| 3,690,080 A | | 9/1972 | Dillard |
| 5,509,747 A | * | 4/1996 | Kiendl .................. B64G 1/222 136/245 |
| 6,237,241 B1 | | 5/2001 | Aaron et al. |
| 9,540,091 B1 | | 1/2017 | MacCallum et al. |
| 10,773,833 B1 | * | 9/2020 | Harvey ................... H02S 10/40 |

(Continued)

FOREIGN PATENT DOCUMENTS

JP     2004217077     8/2004

OTHER PUBLICATIONS

Aaron , et al., "Highpower Solar Array System For Balloons", AIAA's 3rd Annual Aviation Technology, Integration, and Operations (ATIO) Technology Conference, Denver, CO, Nov. 17, 2003, pp. 1-11.

(Continued)

*Primary Examiner* — Jayne L Mershon
(74) *Attorney, Agent, or Firm* — Schwegman Lundberg & Woessner, P.A.

(57) ABSTRACT

Aspects of the disclosure relate to high altitude or stratospheric balloon systems. For instance, a stratospheric balloon system may include a an upper structure, a lower structure, a platform associated with the lower structure, a stack of solar panels positioned on the platform, each solar panel coupled to an adjacent solar panel, at least one tension element connected, at a first end thereof, to the upper structure and, at a second end thereof, to the platform, and a first flexible tension member coupled, at a first end thereof, to the upper structure and to foremost solar panel of the stack of solar panels. Solar panels may be stacked in a "Z-fold" configuration with either solar cells of the adjacent solar panels facing one another or the frames of the adjacent solar panels facing one another. In this configuration, the adjacent solar panels are connected by a hinge system.

8 Claims, 18 Drawing Sheets

(56) References Cited

U.S. PATENT DOCUMENTS

| | | |
|---|---|---|
| 10,917,034 B1 | 2/2021 | Cromie et al. |
| 2012/0313569 A1 | 12/2012 | Curran |
| 2013/0240015 A1* | 9/2013 | Chaimovski ............ H02S 10/40 136/245 |

OTHER PUBLICATIONS

Garcia, et al., "About the Space Station Solar Arrays", Available Online at: <https://www.nasa.gov/mission_pages/station/structure/elements/solar_arrays-about.html>, Aug. 3, 2017, pp. 1-4.

Garcia, et al., "International Space Station Solar Arrays", Available Online At: <https://www.nasa.gov/mission_pages/station/structure/elements/solar_arrays.html>, Aug. 3, 2017, pp. 1-8.

Mathewson, "NASA Tests Flexible Roll-Out Solar Array on Space Station", Available Online At: <https://www.space.com/37250-roll-out-solar-arrays-on-space-station.html>, Jun. 20, 2017, pp. 1-8.

McKinnon, "Solar Panels Are The Overlooked Workhorses", Available Online At: <https://gizmodo.com/solar-panels-are-the-overlooked-workhorses-of-the-inter-1737149074>, Oct. 30, 2015, pp. 1-5.

"U.S. Appl. No. 16/209,160, Advisory Action dated Nov. 6, 2020", 3 pgs.

"U.S. Appl. No. 16/209,160, Examiner Interview Summary dated Nov. 23, 2020", 3 pgs.

"U.S. Appl. No. 16/209,160, Final Office Action dated Sep. 9, 2020", 17 pgs.

"U.S. Appl. No. 16/209,160, Non Final Office Action dated Apr. 9, 2020", 13 pgs.

"U.S. Appl. No. 16/209,160, Notice of Allowance dated Dec. 1, 2020", 8 pgs.

"U.S. Appl. No. 16/209,160, Response filed Feb. 13, 2020 to Restriction Requirement dated Feb. 6, 2020", 7 pgs.

"U.S. Appl. No. 16/209,160, Response filed Jun. 29, 2020 to Non Final Office Action dated Apr. 9, 2020", 10 pgs.

"U.S. Appl. No. 16/209,160, Response filed Oct. 29, 2020 to Final Office Action dated Sep. 9, 2020", 9 pgs.

"U.S. Appl. No. 16/209,160, Response filed Nov. 23, 2020 to Advisory Action dated Nov. 6, 2020", 9 pgs.

"U.S. Appl. No. 16/209,160, Restriction Requirement dated Feb. 6, 2020", 5 pgs.

\* cited by examiner

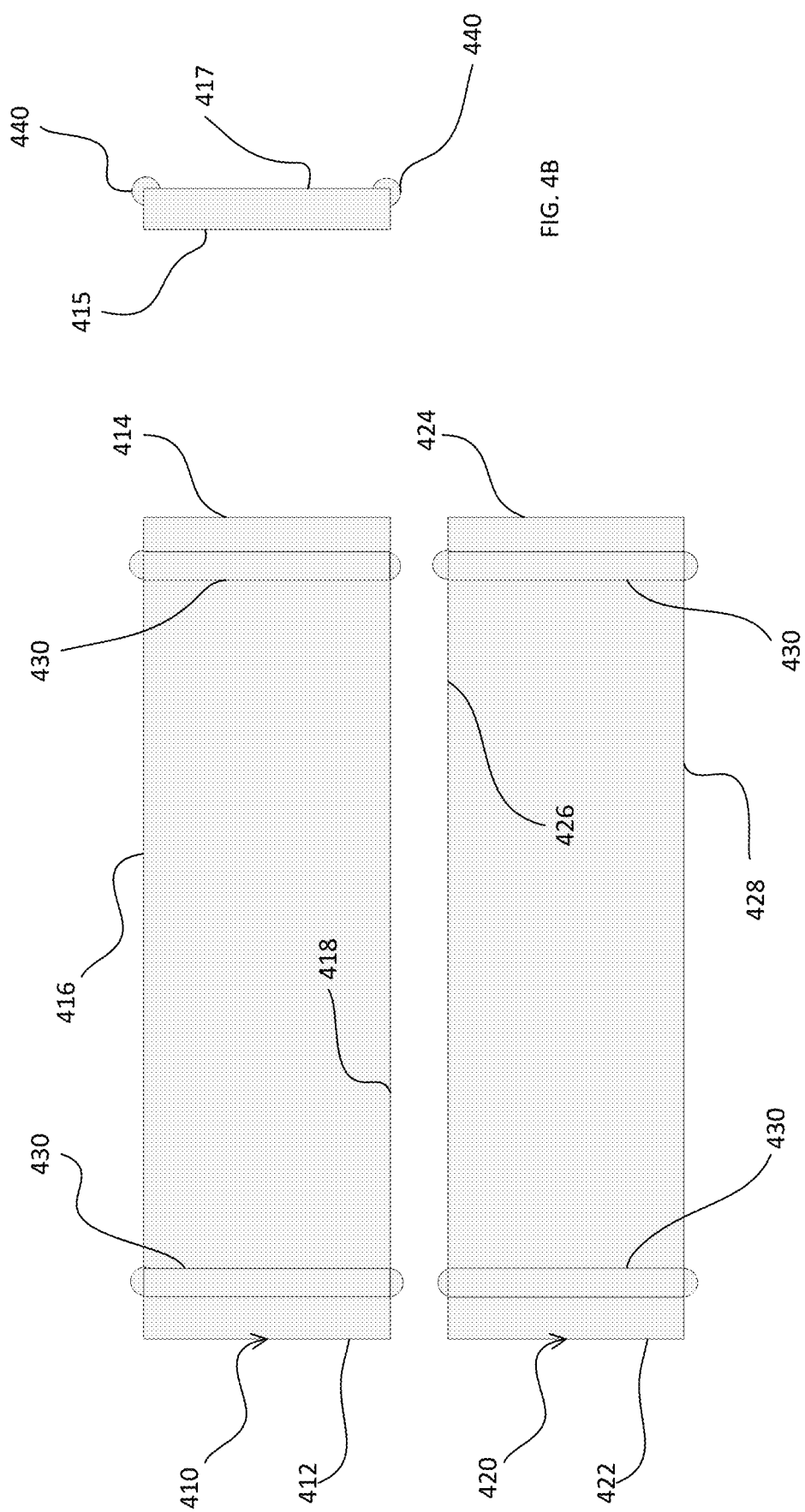

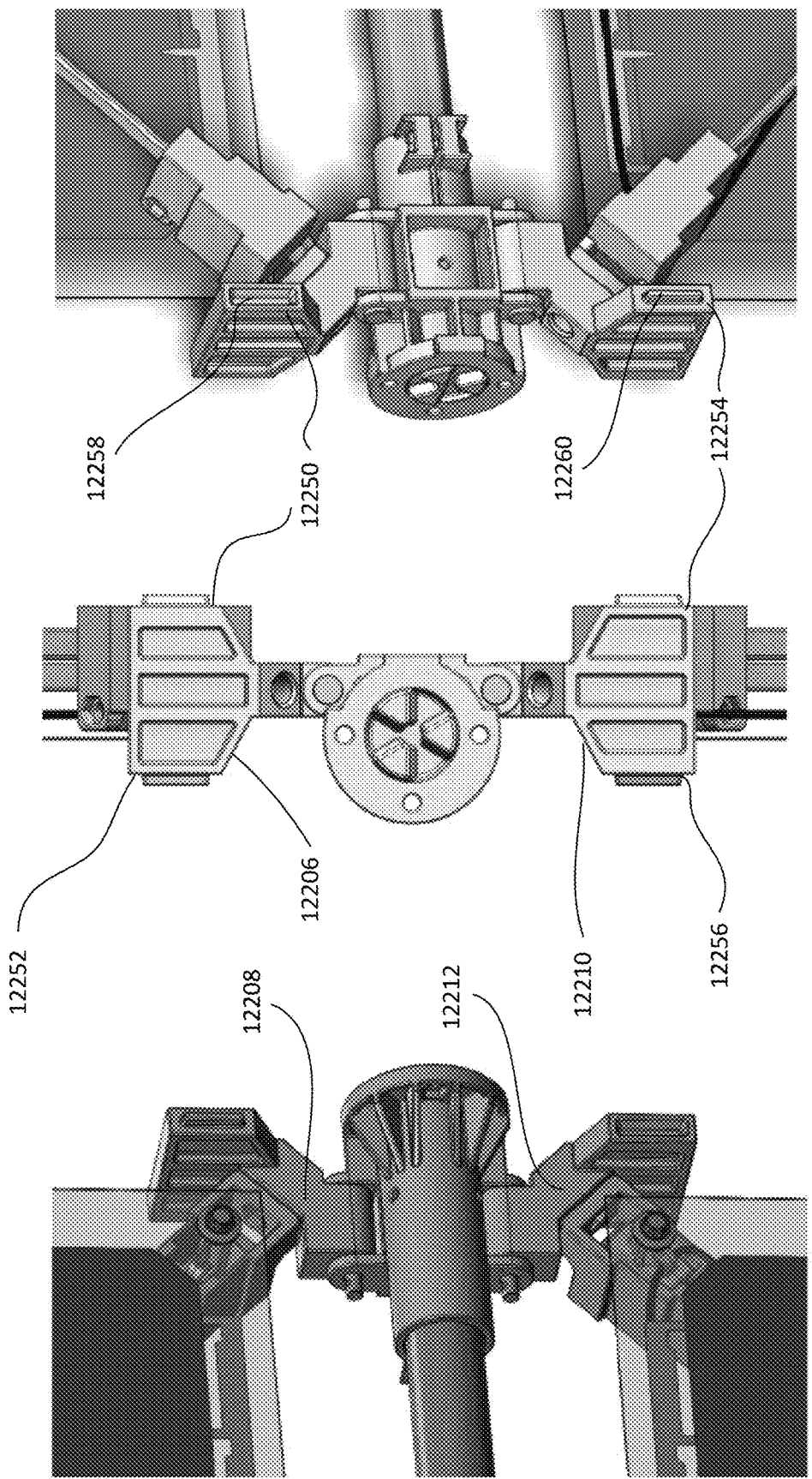

DEPLOYABLE SOLAR PANELS FOR HIGH-ALTITUDE BALLOONS

CROSS-REFERENCE TO RELATED APPLICATIONS

The present application is a divisional of U.S. application Ser. No. 16/209,160, filed Dec. 4, 2018, which claims the benefit of the filing date of U.S. Provisional Patent Application No. 62/595,188 filed Dec. 6, 2017, the disclosures of which are hereby incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable. Some systems may provide network access via a balloon network.

BRIEF SUMMARY

One aspect of the disclosure provides a balloon system. In one example, system may include an upper structure, a lower structure, a platform associated with the lower structure, a first array of solar panels positioned on the platform in a stacked, each solar panel having a frame and solar cells and coupled to an adjacent solar panel via a hinge system so as form a Z-fold stack, wherein in the Z-fold stack, solar cells of the first solar panel faces solar cells of the second solar panel, and a frame of the second solar panel faces a frame of the third solar panel, at least one tension element connected, at a first end thereof, to the upper structure and, at a second end thereof, to the platform, and a first flexible tension member coupled, at a first end thereof, to the upper structure and to a foremost solar panel of the stack of solar panels.

In an example, the hinge system includes a first hinge base connected to the first and second solar panels, a second hinge base connected to the first and second solar panels, and a hinge rod extending between the first and second hinge bases, such that the first and second solar panels are configured to pivot about the first hinge base, the second hinge base and the hinge rod. In one example, the hinge rod is spaced by apart from a first transverse edge of the first solar panel and a first transverse edge of the second solar panel.

In one example, each of the first and second hinge bases includes a first bracket feature for connection with the first solar panel and a second bracket feature for connection with the second solar panel. In an example, the hinge system further includes a first connecting arm pivotably coupled with the first bracket feature of the first hinge base, a second connecting arm pivotably coupled with the first bracket feature of the second hinge base, a third connecting arm pivotably coupled with the second bracket feature of the first hinge base, and a fourth connecting arm pivotably coupled with the second bracket feature of the second hinge base. The hinge system further includes a first pivot pin secured to the first bracket feature of the first hinge base and pivotably coupling the first connecting arm with the first bracket feature of the first hinge base, a second pivot pin secured to the first bracket feature of the second hinge base and pivotably coupling the second connecting arm with the first bracket feature of the second hinge base, a third pivot pin secured to the second bracket feature of the first hinge base and pivotably coupling the third connecting arm with the second bracket feature of the first hinge base, and a fourth pivot pin secured to the second bracket feature of the second hinge base and pivotably coupling the fourth connecting arm with the second bracket feature of the second hinge base.

In an example, each of the first and second connecting arms coupled with the first and second hinge bases includes an alignment feature configured to align the first and second solar panels when in a stacked configuration so as to maintain a predetermined distance between the first and second solar panels. The alignment feature of the first connecting arm coupled with the first hinge base includes a cavity. The alignment feature of the second connecting arm coupled with the first hinge base includes a rib, the rib being complementary to the cavity.

According to one aspect, the first and second hinge bases include a first sleeve and a second sleeve, respectively, the first sleeve configured to receive a first end of the hinge rod and the second sleeve configured to receive a second end of the hinge rod. According to another aspect, the first and second hinge bases include a first flange and a second flange, respectively, each of the first and second flanges configured to be coupled with a flange of an adjacent hinge base of an adjacent solar panel array. In one example, the system further includes a second array of solar panels coupled to the first array of solar panels such that at least some of the flanges of the hinge systems of the first array are connected to at least corresponding flanges of the hinge systems of the second array. In an example, a number of solar panels in the second array of solar panels is equal to a number of solar panels in the first array. According to an aspect, in a deployed configuration of the first array, a transverse edge of the first solar panel is spaced apart from a transverse edge of the second solar panel.

Another aspect of the disclosure provides a solar array system includes a first vertical sub-array of solar panels configured to be assume a deployed configuration and a stacked configuration, each solar panel coupled to an adjacent solar panel via a hinge system between each pair of solar panels so as form a "Z-fold" stack in the stacked configuration, wherein in the "Z-fold" stack, solar cells of the first solar panel faces solar cells of the second solar panel, and a frame of the second solar panel faces a frame of the third solar panel. Each solar panel is configured to pivot relative to the hinge system when changing from the deployed configuration to the stacked configuration and from the deployed configuration to the stacked configuration.

Yet another aspect of the disclosure provides a method of forming a solar panel array. In one example, the method includes providing a first solar panel, positioning a second solar panel adjacent to the first solar panel such that either solar cells of the second solar panel face solar cells of the first solar panel or a frame of the second solar panel faces a frame of the first solar panel, and coupling the second solar panel to the first solar panel using a hinge system so as to allow the first and the second solar panels to pivot relative to the hinge system about a first hinge axis and a second hinge axis, respectively, thereby forming a first vertical sub-array of solar panels.

According to an aspect, the method further comprises forming a second vertical sub-array of solar panels, positioning the second vertical sub-array adjacent the first vertical sub-array, and securely connecting at least one flange of a first hinge system of the first vertical sub-array to a corresponding flange of a first hinge system of the second vertical sub-array.

According to an aspect, coupling the second solar panel to the first solar panel using a hinge system includes pivotably coupling first and second connecting arms coupled to the first solar panel to a first hinge base and a second hinge base, respectively, of the hinge system and pivotably coupling third and fourth connecting arms coupled to the second solar panel to the first hinge base and the second hinge base, respectively. According to an aspect, coupling the second solar panel to the first solar panel using a hinge system includes using a first pivot pin to pivotably couple the first connecting arm to the first hinge base, using a second pivot pin to pivotably couple the second connecting arm to the second hinge base, using a third pivot pin to pivotably couple the third connecting arm to the first hinge base, and using a fourth pivot pin to pivotably couple the fourth connecting arm to the second hinge base.

BRIEF DESCRIPTION OF THE DRAWINGS

FIGS. 4A-4B illustrate front view and side view, respectively, of two adjacent solar panels in accordance with aspects of the present disclosure.

FIGS. 16A-16C illustrate a bottom view, a side view and a top view, respectively, of the hinge mechanism of FIG. 13 in an open configuration in accordance with aspects of the present disclosure.

DETAILED DESCRIPTION

Overview

Figure 1:
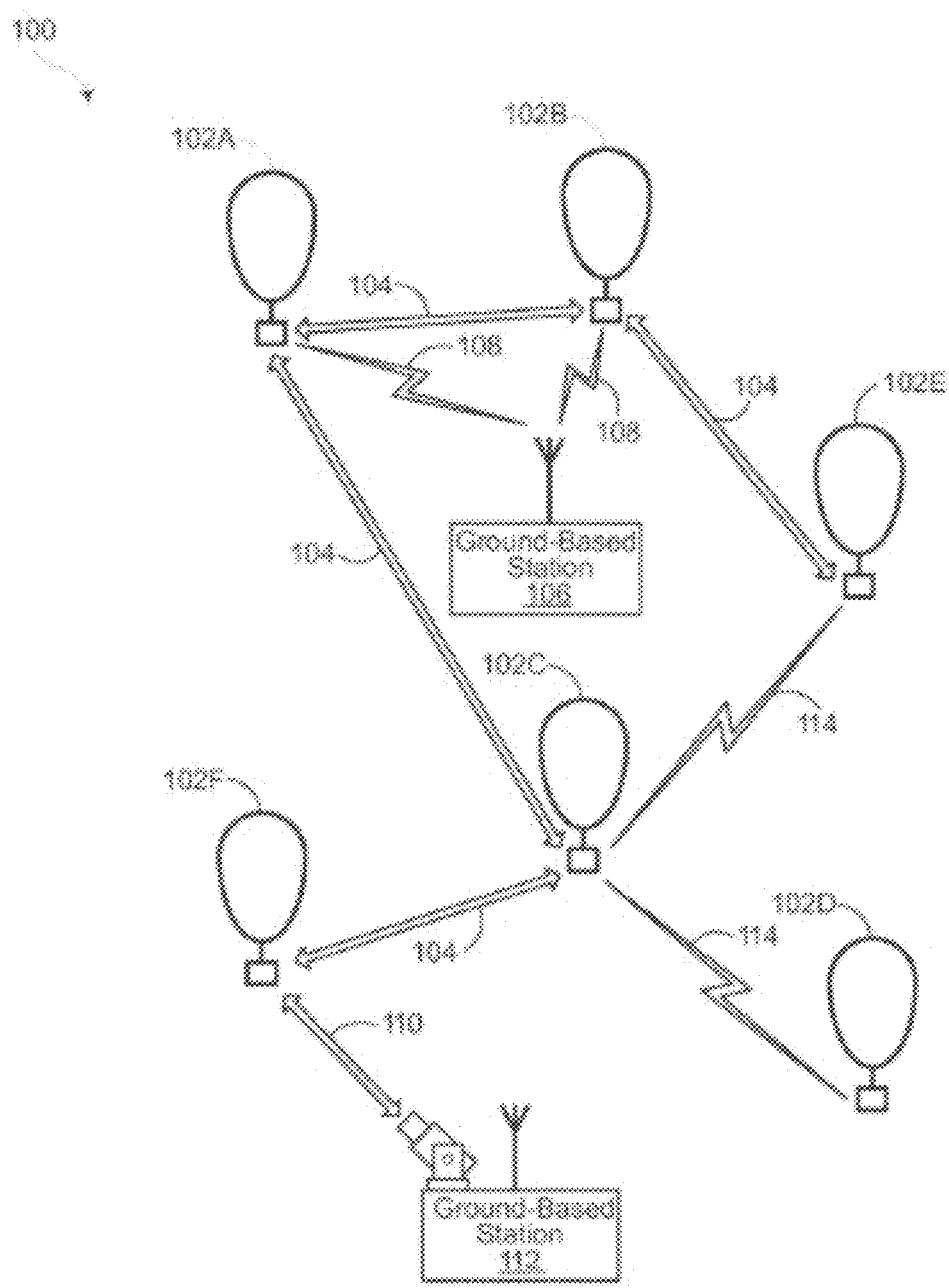
FIG. 1 is a functional diagram of a network in accordance with aspects of the disclosure.

The technology relates to high altitude balloons which utilize solar panels to generate power. To do so, an array of solar panels having a large panel area for power generation is required. The array can be fairly large, for example including 4, 8, 12 or more panels, which can be difficult to maneuver and position prior to launch of a balloon due to bulk, weight, potential for damage, and lack of space. To address these issues, prior to launch, for ease of transport, storage, ground handling and launch equipment, solar panels may be stacked in a relatively compact array up until the launch of the balloons. When the balloons are launched, the solar panels of the array may be deployed to an expanded state using gravity as the primary actuator.

To achieve this deployment, a high altitude balloon may include a payload having an upper structure, a lower structure and a platform coupled to the lower structure, between the upper and the lower structure. The upper and the lower structures may be connected by a series of tension lines which are routed to a spool with a torsional damper. An electro-mechanical or pyrotechnic device for initiating and/or controlling the rotational movement of the spool of the tension lines may be attached to the spool. Prior to deployment, an array including a stack of solar panels may be in a stowed condition, supported on the platform. The solar panels may be stacked face to back at any orientation, for instance, horizontal, vertical, or at any angle between the horizontal and the vertical in one example. In the first example, the solar panels may be stacked so as to form a single vertical array with multiple solar panels, described in detail below.

The foremost solar panel in the stack may be connected to the upper structure by a separate tension line of a fixed length at an upper edge of the solar panel. The fixed length of the separate tension line may be determined by the desired distance of the foremost solar panel from the upper structure. For example, the fixed length of the separate tension line may be sufficient to position the foremost solar panel with minimal shadows from the upper structure and the balloon based on a given sun overhead angle at a particular position above the earth. Each subsequent solar panel may be connected to the preceding solar panel along their upper edges via flexible tension members, e.g., a rope, a wire, and a cable. The flexible tension members may be made of any suitable material such as a metal, nylon, and CFRP.

Each panel may include at least one bracket that is bonded or fastened at the top edge. The bracket may define a pin joint with the flexible member. In one example, the bracket may be installed at the midpoint of the width of the upper edge of the solar panel. Each panel may include a second bracket configured to be coupled to an electrical cable harness for transferring the electric power generated by the solar panel to a common component, for example, a battery for storing the electrical power. Such a battery may be located either in the upper structure or in the lower structure or both. Each solar panel may include a transformer. The transformer may be associated with the at least one bracket. In other cases, the transformer may be spaced apart from the at least one bracket.

In one example, a separate flexible member may be connected to the brackets at the top edges of each pair of two adjacent solar panels. Each of the flexible tension members may have a length equal to or slightly longer than the height of the solar panels. In one example, all the solar panels of the stack have similar dimensions, for example, the height and the width. In such a case all of the flexible tension members have a similar length. In other examples, the solar panels may have different dimensions, for example, different heights. In such a case the length of the flexible member corresponds to the height of the solar panel from which the flexible member is supported. In some cases, the same bracket may be used to connect a solar panel to the solar panel above it and to the solar panel below. In other cases, a first bracket may be used to connect a solar panel to the solar panel above it and a second bracket may be used to connect to the solar panel below it.

As an alternative, a single flexible member may be connected to the brackets at the top edges of all the solar panels, with a fixed predetermined spacing between the adjacent solar panels along the single flexible member. The single flexible member may have multiple tie-off loop points, with each one tie-off loop point coupling to a solar panel. The fixed predetermined spacing may be equal to or slightly larger than the height of the solar panel. In this case, a relative movement between the solar panels and the single flexible member may be restrained.

To prevent damage as the solar panels slide relative to one another, and to assist in alignment during the deployment, each panel may include a set of guide channels defined on the top surface proximal to the lateral edges of the panel. Each panel may also include a feature, for example, a roller or a protrusion complementary to the guide channel, at the back surface close to or at the lower edge of the panel.

During launch of the balloon, as the balloon begins to rise, the spool may be released in order to deploy the array. Upon release, the spool begins to rotate and the tension lines may be allowed to unwind in a controlled manner, thereby increasing the distance between the upper structure and the lower structure. As the lower structure along with the platform descends beyond the length of the separate tension line connecting the foremost solar panel to the upper structure, further descent of the foremost solar panel may be arrested. The foremost solar panel may then be separated from the stack, while the rest of the stack continues its descent along with the platform and the lower structure.

As the stack of the panels continues its descent, the features of the foremost panel being deployed may be guided along the guide channels of the second panel in the stack. This may ensure alignment of the foremost panel as well as preventing undesirable relative movement between the foremost panel being deployed and the rest of the stack. Once the remaining stack is sufficiently far from the foremost panel, the foremost panel may hang vertically from the flexible member, thereby achieving its deployed position.

When the platform and the lower structure descends beyond a distance equal to the length of the flexible tension member between the foremost solar panel and the second solar panel, the second solar panel may stop its descent, while the rest of the panels continue their descent. The features of the second solar panel may be guided along the guide channel of the third solar panel in the stack. Once the remaining stack is sufficiently far from the second panel, the second panel hangs vertically from the flexible member. Thus, as the platform and the lower structure continue to descend, each successive panel begins to hang from the panel above and deploy off the stack until all the panels have deployed. Thus, all of the solar panels may be deployed vertically from the stacked state.

In another example, a solar panel array may be stacked in a "Z-fold" configuration. In the "Z-fold" configuration, the solar panels are stacked such that either the solar cells of a first solar panel in the stack face the solar cells of an adjacent solar panel or a frame of the first solar panel in the stack faces the frame of an adjacent solar panel. The adjacent solar panels are connected to one another by a hinge system such that the adjacent solar panels may pivot relative to the hinge system. In one example, the hinge system includes a first hinge base, a second hinge base and a hinge rod extending between the first and second hinge bases. Each of the first and second hinge bases includes bracket features configured to pivotably connect to the corresponding solar panels in one example. The adjacent solar panels are configured to pivot relative to the bracket features between a stacked configuration and a deployed configuration.

In yet another example, the solar panel array may include multiple vertical sub-arrays of solar panels. In one configuration, all the hinge systems connecting two adjacent solar panels in a vertical sub-array may be connected to corresponding adjacent hinge systems of an adjacent vertical sub-array. In another configuration, only some of the hinge systems of a first vertical sub-array of solar panels may be connected to the corresponding hinge systems of a second vertical sub-array adjacent to the first vertical sub-array.

The features described herein allow for the deployment of the solar panels vertically with the aid of gravity, without any complex mechanisms which may add undue weight. The guide channels and the feature may allow the solar panels to deploy in an aligned manner without damaging the solar panels due to undesirable relative movement between the two adjacent solar panels.

Example Balloon Network

FIG. 1 depicts an example network 100 in which a balloon as described above may be used. This example should not be considered as limiting the scope of the disclosure or usefulness of the features of the films and balloon envelopes as described herein. For example, the films may be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground based stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
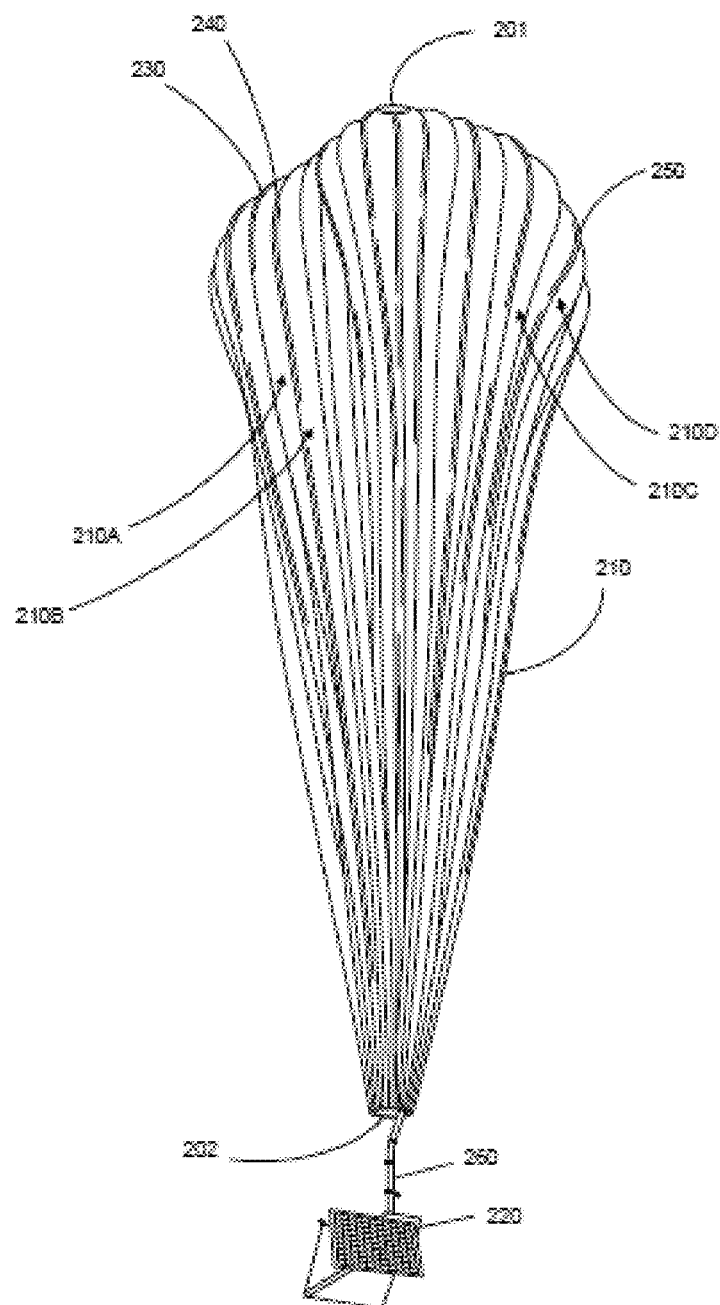
FIG. 2 is an example of a balloon in accordance with aspects of the disclosure.

FIG. 2 is an example stratospheric balloon 200, which may represent any of the balloons of balloon network 100. As shown, the balloon 200 includes a balloon envelope 210, a payload 220 and a plurality of tendons 230, 240 and 250 attached to the balloon envelope 210. In this example, balloon envelope 210 may be inflated to a desired level, but not yet pressurized.

The balloon envelope 210 may take various forms. In one instance, the balloon envelope 210 may be constructed from materials such as polyethylene that do not hold much load while the balloon 200 is floating in the air during flight. Further, the volume of the balloon envelope may be on the order of 2000 cubic meters. However, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical or radio communication system, a navigation system, a positioning system, a lighting system, an altitude control system and a power supply to supply power to various components of the payload 220. One example of the power supply may include solar panels for harvesting solar energy.

Figure 3:
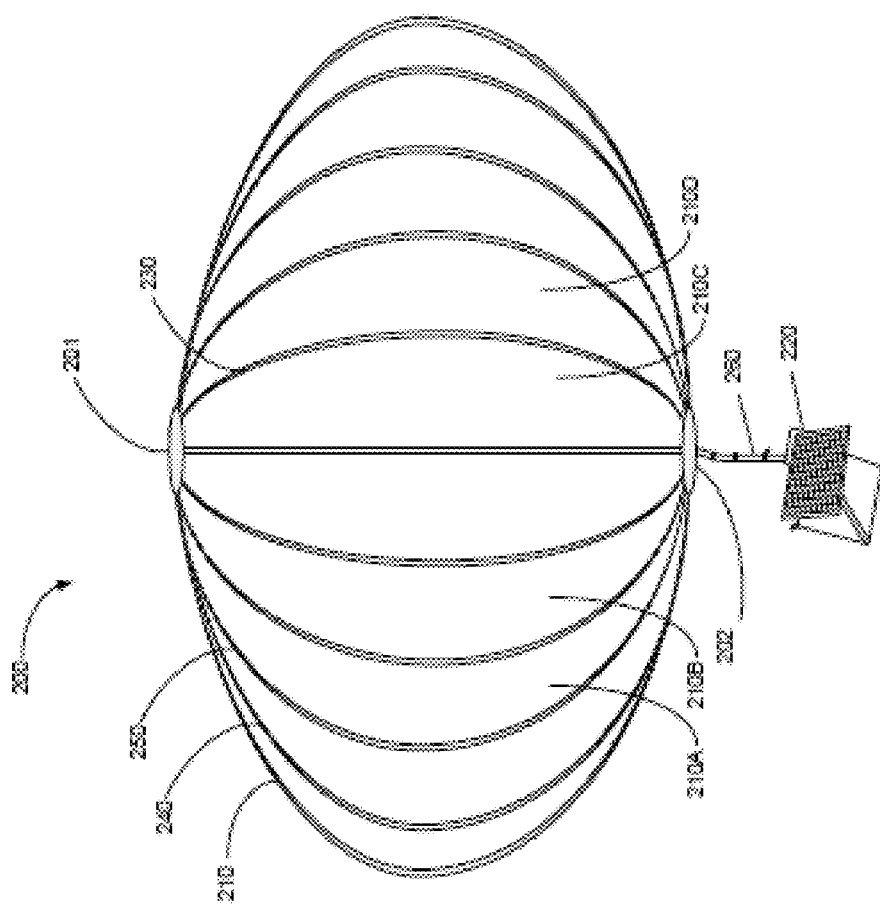
FIG. 3 is another example of the balloon of FIG. 2.

FIG. 2 depicts the balloon envelope 210 inflated with lift gas close to ground level, for instance, at atmospheric pressure. As the balloon rises and the atmospheric pressure drops, the lift gas within the balloon envelope expands, changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

Solar Panels—First Example

FIG. 4A schematically illustrates a front view of two adjacent solar panels 410, 420 while FIG. 4B schematically illustrates a side view of the solar panel 410. For the sake of clarity, solar cells are not illustrated in these drawings. In the illustrated example, the solar panel 410 has a front surface 415, a rear surface 417, first and second lateral edges 412, 414 and first and second transverse edges 416, 418. Likewise, the solar panel 420 has first and second lateral edges 422, 424 and first and second transverse edges 426, 428. In one example, the front surfaces 415, 425 include the solar cells.

The solar panel 410 includes two guide channels 430 defined on the front surface 415, proximal to the lateral edges 412, 414. Likewise, the solar panel 420 includes two guide channels 430 on the front surface, proximal to the lateral edges 422, 424. While the illustrated example includes two guide channels, other examples may have less than two or more than two guide channels. In an example, the guide channels 430 may be located at a distance ranging from 25% to about 75% from the laterals edges 412, 414, 422, 424. The location of the guide channels 430 may also be varied related to the lateral edges of the solar panels in other examples. In one example, the guide channels 430 may take the form of tracks defined in the front surface 415. In another example, the guide channels 430 may take the form of grooves defined on the front surface 415. The guide channels 430 may be fully or partially embedded in the front surface 415 of the solar panel 410. In an example, the guide channel may have a width from about 0.5 inches (in.) to about 1.5 in. and a depth of about 1 centimeter (cm) to about 10 cms.

The solar panels 410, 420 further include projections or features 440 defined on the rear surfaces 417, at or in the vicinity of the transverse edges 416, 418, 426, 428, respectively, in an example. The projections 440 are shaped complementary to the guide channels 430. In one example, the projections 440 may take the form of rollers or casters which can roll or otherwise move relative to the guide channels 430. In other examples, the projections 440 may be generally hemispherical beads complementary to the guide channels 430. In an example, the projections 440 protrude from the rear surface 417 as well as from the transverse edges 418, 428.

Figure 5C:
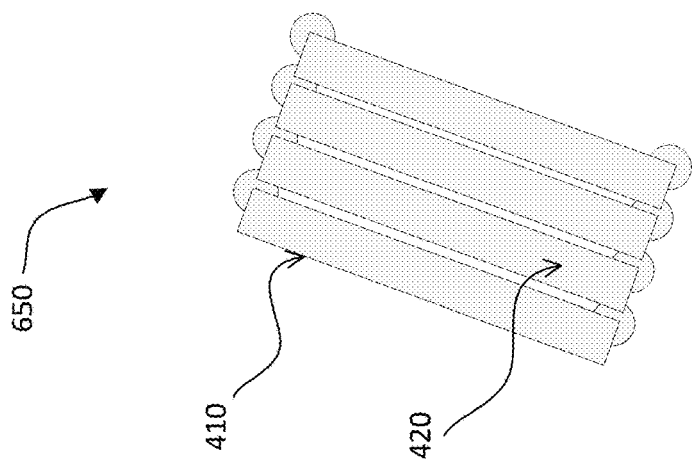
FIGS. 5A-5C illustrate stacks of solar panel in a horizontal, a vertical, and an angled orientation, respectively, in accordance with aspects of the present disclosure.
Figure 5B:
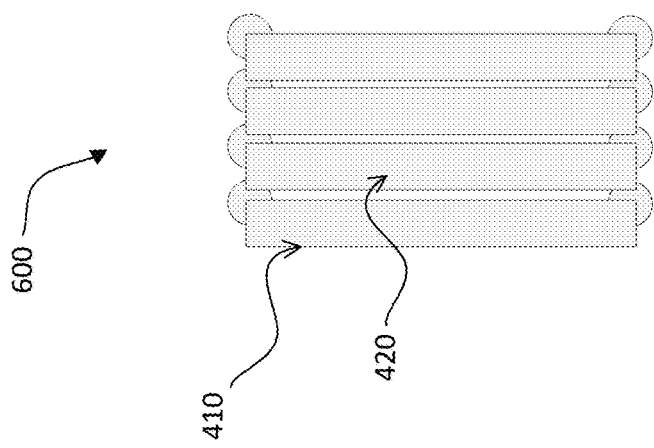
Figure 5A:
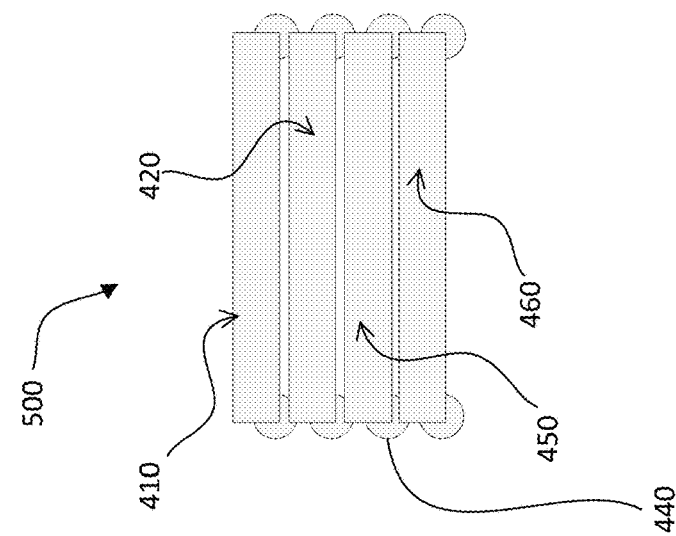

FIG. 5A illustrates a stack 500 of solar panels 410, 420, 450, 460 in a horizontal orientation. FIG. 5B illustrates a stack 600 of solar panels 410, 420, 450, 460 in a vertical orientation. FIG. 5C illustrates a stack 650 of solar panels 410, 420, 450, 460 in an angled orientation. In each of the stacks 500, 600, 650, the topmost or foremost solar panel 410 is stacked over adjacent solar panel 420, the solar panel 420 is stacked over adjacent solar panel 450 and so on. The projections 440 of the foremost solar panel 410 rest in the guide channels 430 of the adjacent solar panel 420. Such an arrangement facilitates maintaining a predetermined distance between the rear surface 417 of the solar panel 410 and the front surface 425 of the solar panel 420 when the solar panel 410 is stacked over the solar panel 420. As will be understood, the predetermined distance may be adjusted by adjusting the dimensions of the guide channels 430 and the projections 440 of the corresponding solar panels. The larger the size of the projections 440 and the guide channels 430, the greater the distance between two adjacent solar panels. In one example, all the solar panels 410, 420, 430 of the array 500 have similar dimensions, i.e., height, width, and thickness.

Figure 6:
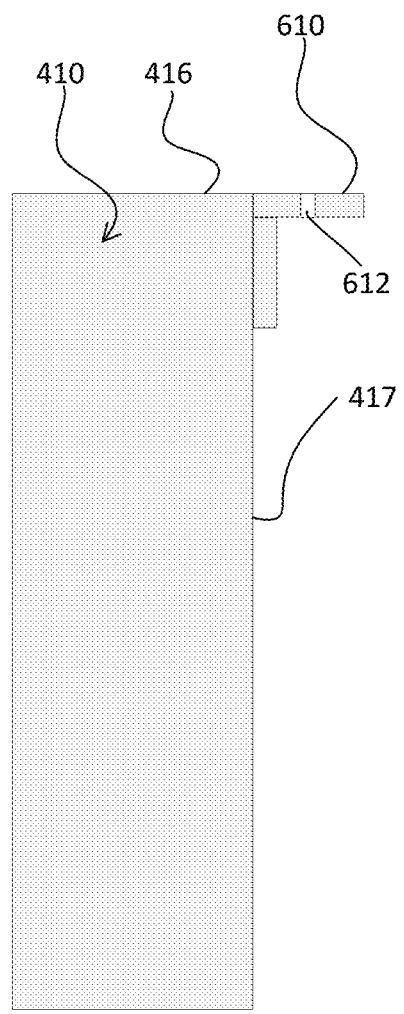
FIG. 6 illustrates a portion of a solar panel with a bracket in accordance with aspect of the present disclosure.

FIG. 6 illustrates a portion of the solar panel 410. In an example, the solar panel 410 includes a bracket 610 on the rear side 417 in the vicinity of the transverse edge 416. The bracket 610 includes a through-aperture 612. The bracket 610 may be secured or fastened to the solar panel 410 using, by way of non-limiting examples, glues, adhesives, fasteners such as screws and bolts. In other examples, the solar panel 410 may have more than one brackets secured or fastened to the solar panel. In yet other examples, the bracket 610 may include more than one apertures 612. In one example, the bracket 610 may be installed at or about the midpoint of the width of the upper edge 416 of the solar panel 410.

Figure 7C:
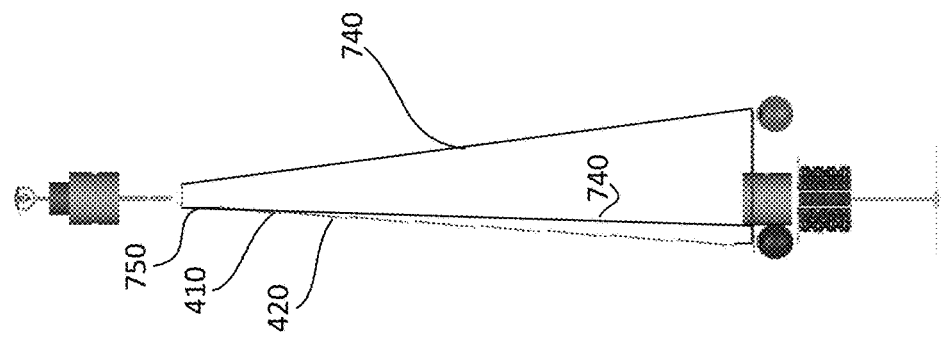
FIGS. 7A-7C illustrate various stages of deployment of the solar panels in side views in accordance with aspects of the present disclosure.
Figure 7B:
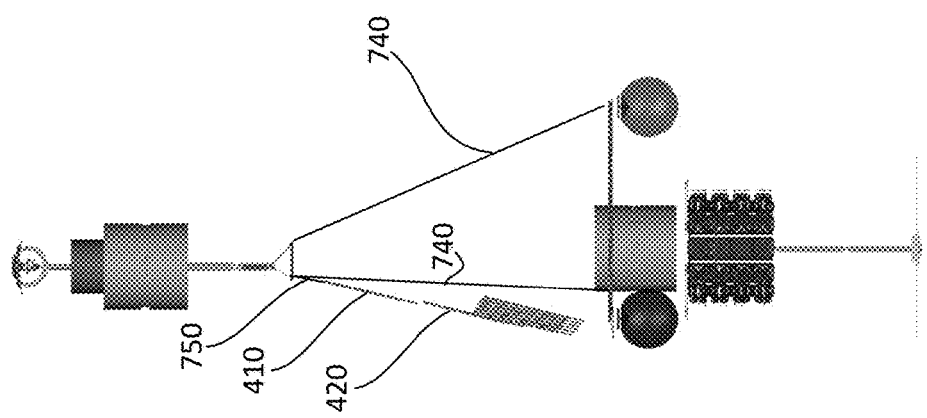
Figure 7A:
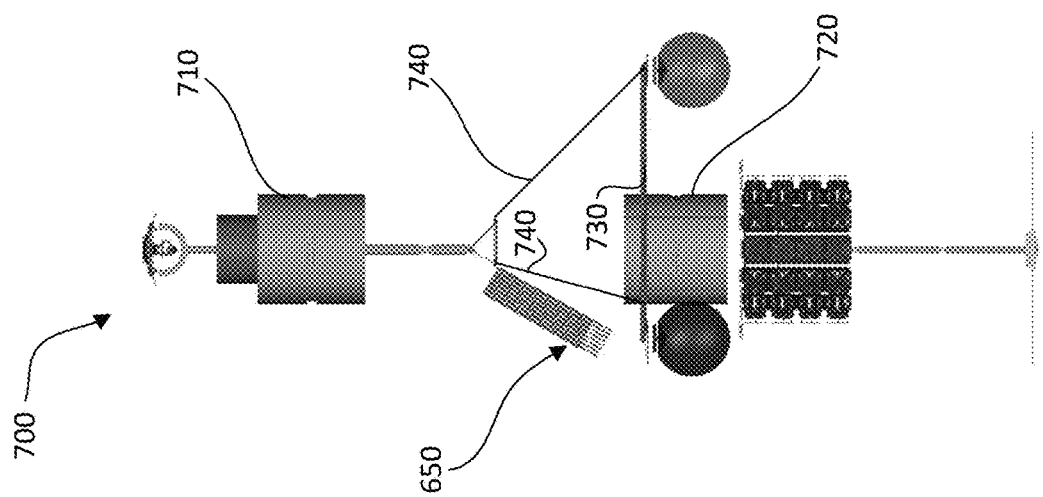
Figure 8C:
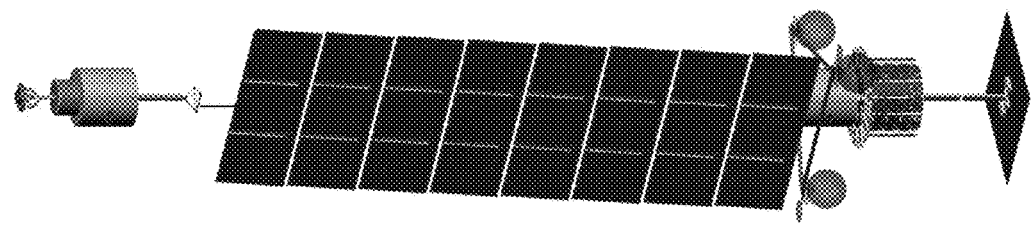
FIGS. 8A-8C illustrate various stages of deployment of the solar panels in front views in accordance with aspects of the present disclosure.
Figure 8B:
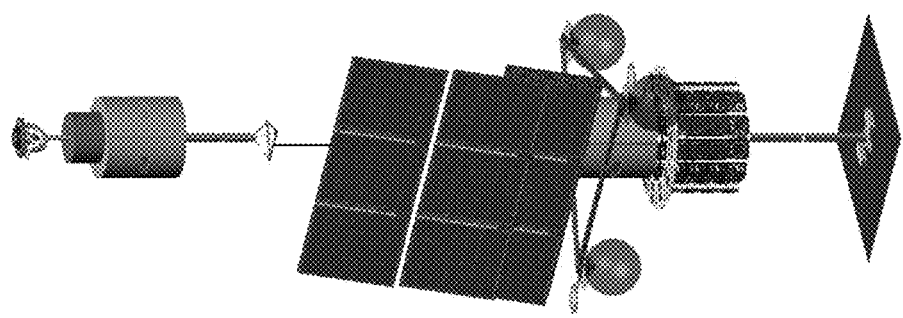
Figure 8A:
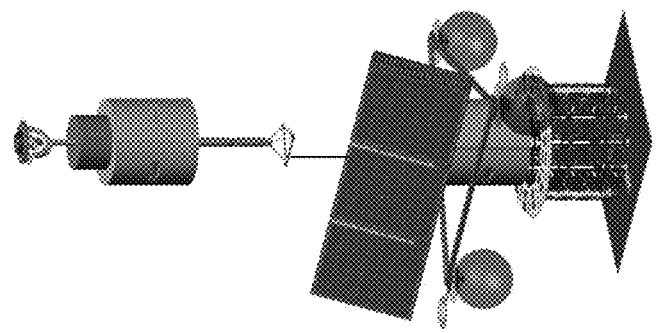

Referring now to FIGS. 7A-7C and 8A-8C, an example of a payload 700 with the solar panels is shown. More particularly, FIGS. 7A and 8A illustrate a stack 650 of the solar panels in a stowed position in a side view and a perspective view, respectively. FIGS. 7B and 8B illustrate an intermediate stage wherein some of the solar panels of the stack 650 have been deployed in a side view and a perspective view, respectively. FIGS. 7C and 8C illustrate a stage wherein all of the solar panels of the stack 650 have been deployed in a side view and a perspective view, respectively. As shown in FIG. 7A, the payload 700 includes an upper structure 710 and a lower structure 720. The lower structure 720 includes a platform 730 on which an array 650 of solar panels may be stacked. The lower structure 720 is coupled to the upper structure 710 via one or more tension elements 740.

Figure 9A:
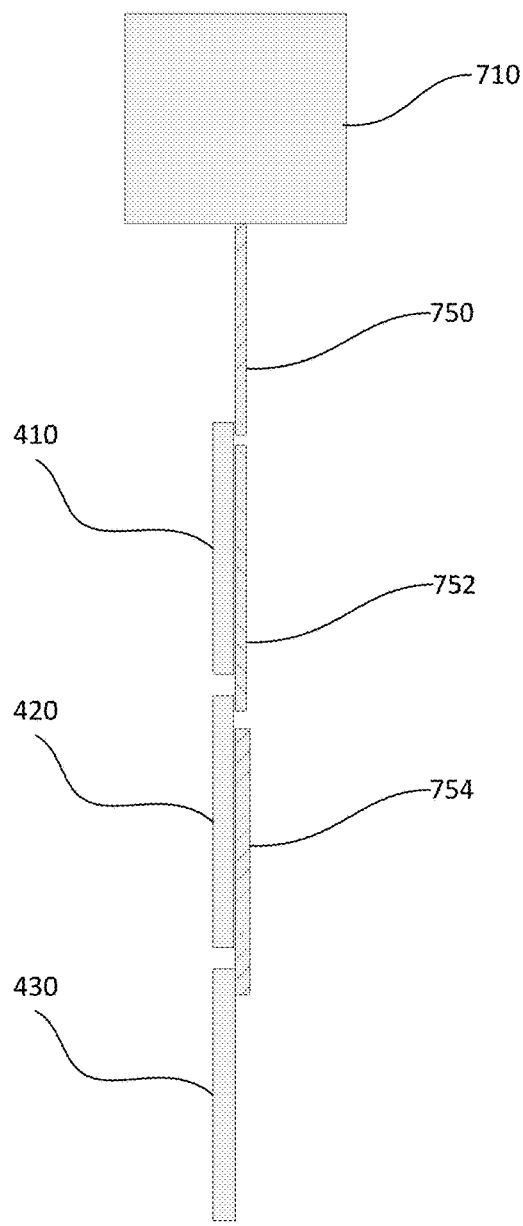
FIGS. 9A-9B schematically illustrate deployed solar panels of two examples in accordance with aspects of the present disclosure.

In one example, such as shown in FIGS. 7B and 9A, the topmost solar panel 410 is coupled to the upper structure 710 via a flexible tension member 750. An adjacent solar panel (e.g., the solar panel 420 of FIG. 5C, adjacent the topmost solar panel 410) is coupled to the topmost solar panel via a flexible tension member 752. (FIG. 9A) Likewise, each subsequent solar panel of the array 500, 600 is coupled to corresponding preceding solar panel via a flexible tension member, for example 754, distinct from the tension elements 750, 752. Non-limiting examples of the flexible tension members 750, 752, 754 include a rope, a wire, a cable, or the like. The flexible tension members 750, 752, 754 may be made of any suitable material such as a metal, nylon, CFRP, etc.

The tension element 750 has a sufficient length to locate the topmost solar panel 410 at a predetermined distance away from the upper structure 710 and the balloon 200 such that any shadow from the upper structure 710 and the balloon 200 is minimized. For example, the tension element 750 may have a length from about 0.5 meter (m) to about 4 m. Each of the flexible tension members 752, 754 has a length equal to or slightly greater than the height of the corresponding solar panel. For instance, the flexible tension member 752 has a length equal to or slightly greater than the height of the solar panel 410 and the flexible tension member 754 has a length equal to or slightly greater than the height of the solar panel 420 (FIG. 9A). For instance, if the solar panel 410 has a height of one (1) meter (m), the flexible tension member 752 may have a length from about one (1) m to about 1.05 m.

Still referring to FIG. 9A, the solar panels 410, 420 may be coupled to the corresponding flexible tension members 750, 752, 754, via the respective brackets 610. In one example, the solar panel has two (2) brackets 610, with the tension element 750 coupled to one bracket 610 and the flexible tension member 752 being coupled to the other bracket 610. In another example, the bracket 610 may have two apertures 612, with the tension element 750 being coupled to one aperture 612 of the bracket 610 and the flexible tension member 752 being coupled to the other aperture 612 of the bracket 610.

Figure 9B:
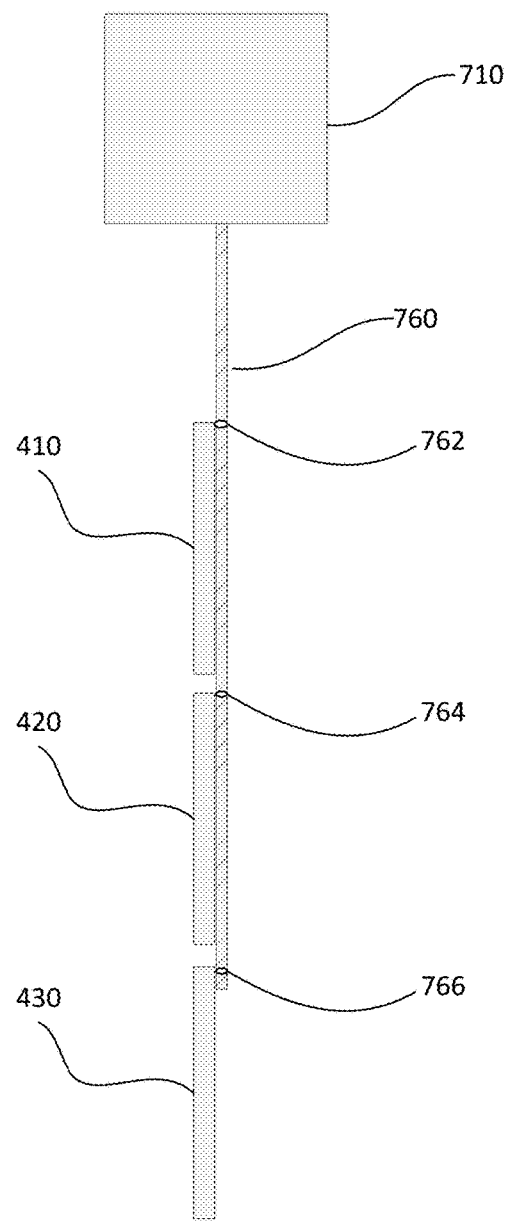

In another example illustrated in FIG. 9B, all the solar panels 410, 420, 430 of the array 500, 600 may be coupled to the upper structure 730 via a single flexible tension member 760. The flexible tension member 760 is coupled to the brackets 610 of all the solar panels 410, 420, 430. The flexible tension member 760 has several tie-off loops or points 762, 764, 766 spaced apart from one another by a predetermined distance. The tie-off loops or points 762, 764, 766 are configured to engage the apertures 612 of the brackets 610 such that the solar panels are coupled to the flexible tension member 760. The tie-off loop points 762, 764, 766 define a pin joint between the corresponding solar panel and the flexible tension member 760. The predetermined distance is equal to or slightly greater than the height of the corresponding solar panels. For instance, the predetermined distance between the tie-off loops or points 762 and 764 is equal to or slightly greater than the height of the solar panel 410.

Figure 10C:
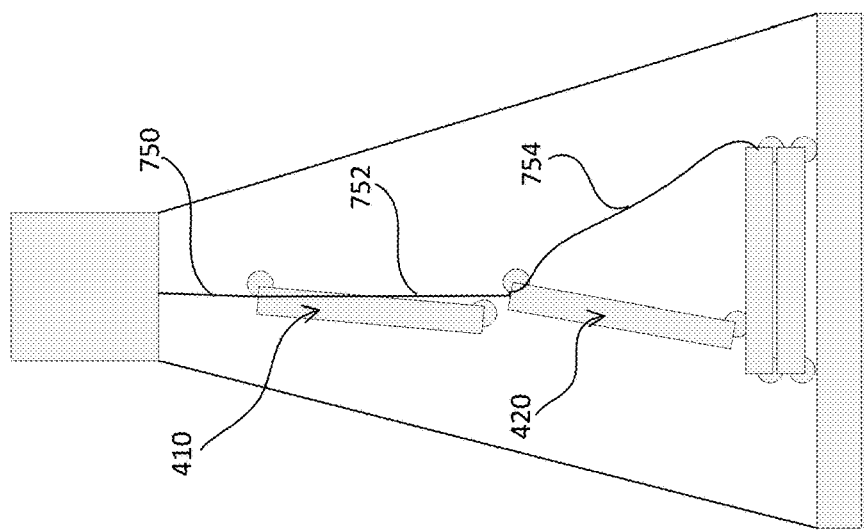
FIGS. 10A-10C schematically illustrate various stages of deployment of the solar panels in side views in accordance with aspects of the present disclosure.
Figure 10B:
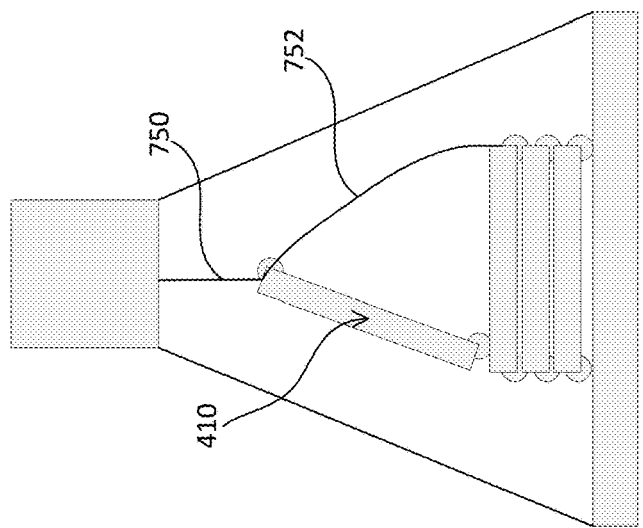
Figure 10A:
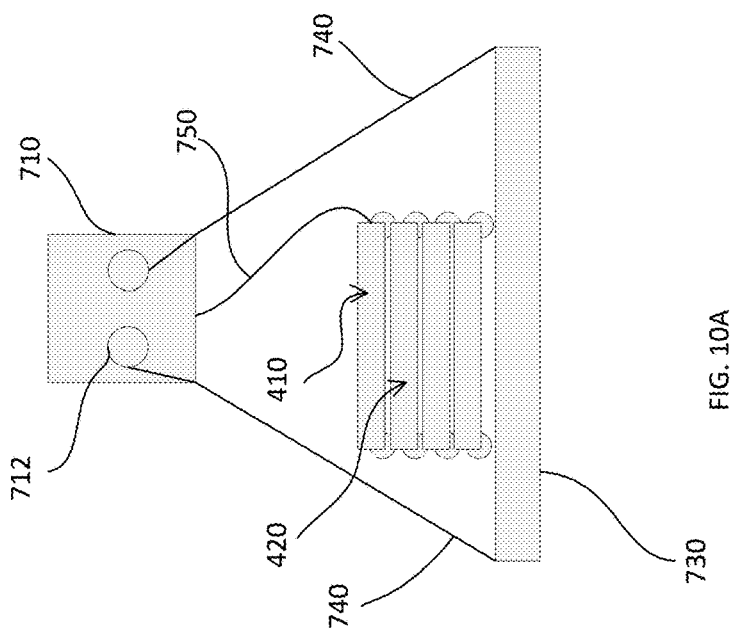

Referring now to FIGS. 10A-10C various stages of deployment of the solar panels will be described. In an initial stage illustrated in FIG. 10A, the solar panels 410, 420 are stacked in an array 500. The array 500 rests on the platform 730. The platform 730 is coupled to the upper structure 710 via tension elements 740. In an example, each tension element 740 may be wound on a spool element 712 in the upper structure 710. In the illustrated example, when the spool element 712 rotates in a clockwise direction, the tension element 740 may be pulled upwards and wound on the spool, thereby pulling the platform 730 towards the upper structure 710. On the other hand, when the spool element 712 rotates in a counterclockwise direction, the tension element 740 may be released from the spool, and the platform 730 may move away from the upper structure 730, for example, when acted upon by gravitational forces. Of course, in other examples, the directions of rotation of the spools may be reversed for the ascent and descent of the platform 730 relative to the upper structure 710. In one example, the spool 712 includes a torsional damper (not shown) to control the rotational speed of the spool, and thereby, the rate of descent of the platform 730 relative to the upper structure 710. Such spools and torsional dampers are known in the art and therefore are not described in further detail for the sake of brevity.

The topmost or foremost solar panel 410 is coupled to the upper structure via the flexible tension member 750. The flexible tension member 750 has a length corresponding to a desired distance of the topmost solar panel 410 from the upper structure 710, when the solar panel 410 is fully deployed. Each subsequent solar panel is coupled to the preceding solar panel via a corresponding flexible tension member, for example, 752, 754 illustrated in FIGS. 10B, 10C. In one example, the flexible tension member coupled to the last solar panel in the array may be connected to the lower platform 730 or the lower structure 720.

In a subsequent stage, when the balloon 200 has reached a predetermined altitude, the lower platform 730 may be allowed to descend relative to the upper structure via the tension elements 740. The spools 712 may be rotated in a counterclockwise direction in the illustrated example to permit the platform 730 to descend relative to the upper structure 710. As soon as the platform 730 has descended by a distance greater than the length of the flexible tension member 750, the flexible tension member 750 may become taut and arrest the descent of the topmost solar panel 410, while the rest of the array 500 and the platform 730 may continue their descent. The projection or feature 440 at the lower edge 418 of the topmost solar panel 410 may be guided by the guide channel 430 of the adjacent solar panel 420. This may ensure alignment of the topmost panel 410 as well as preventing undesirable relative movement between the topmost panel 410 being deployed and the adjacent solar panel 420.

As the tension elements 740 are further released from the spools 712, the platform 730 may continue its descent relative to the upper structure 710. When the platform 730 has descended by a distance greater than the length of the flexible tension element 752, the flexible tension member 752 may become taut and arrest the descent of the adjacent solar panel 420, while the rest of the array 500 and the platform 730 may continue their descent. The projection or feature 440 at the lower edge 428 of the solar panel 420 may be guided by the guide channel 430 of the adjacent solar panel 420. At this stage, the topmost solar panel 410 may be in a nearly vertical, deployed position, held by the flexible tension member 750 and the adjacent solar panel 420 may be nearly deployed, held by the flexible tension member 752. As the platform 730 continues its descent, the remaining solar panels may be deployed in a similar fashion. Thus, the deployment of the solar panels is achieved primarily using gravity.

In another example, instead of the platform 730 moving downward relative to the upper structure 710, the upper structure 710 may be moved upward relative to the platform 730. The solar panels of the array 650 would deploy in essentially the same manner as described above, with the foremost or the topmost solar panel 410 being lifted off the stack 650 as the upper structure 710 moves upward via the flexible tension member 750 and each subsequent solar panel of the stack 650 being lifted off the stack as the upper structure 710 continues its ascent.

First Exemplary Method for Forming a Solar Panel Array

Figure 11:
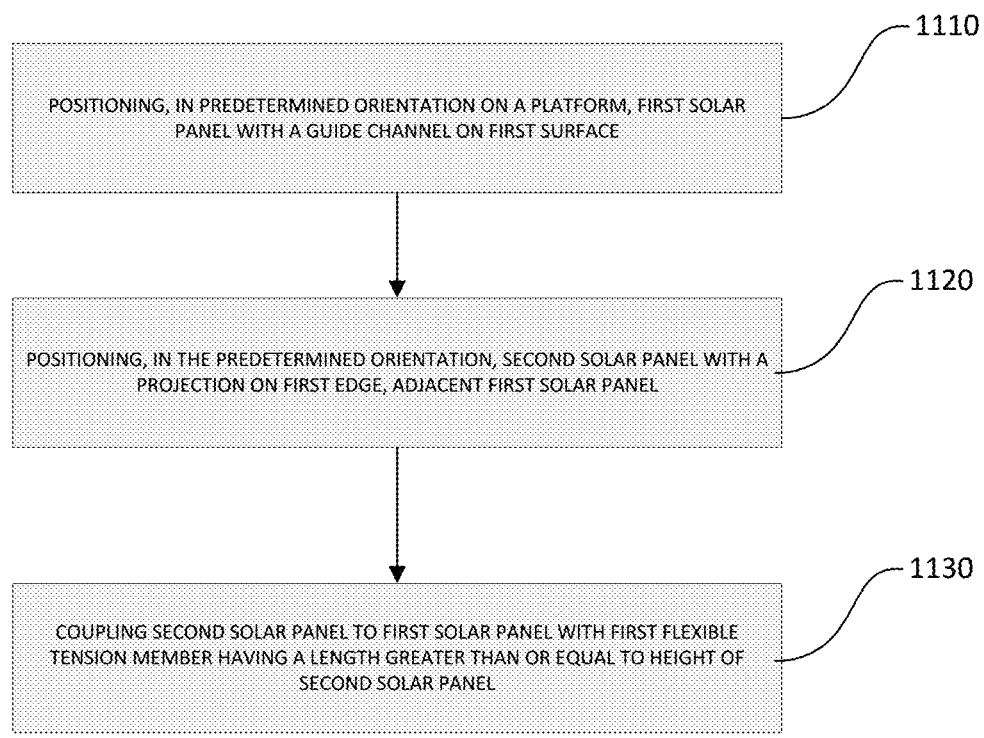
FIG. 11 is a flow chart illustrating a method of forming a solar panel array in accordance with aspects of the present disclosure.

FIG. 11 is a flow chart for forming a solar panel array 500, 600, 650 of FIGS. 5A-5C. At block 1110, a first solar panel 460 is positioned on a platform in a predetermined orientation. For example, in FIG. 5A, the predetermined orientation is a horizontal orientation, in FIG. 5B, the predetermined orientation is a vertical orientation and in FIG. 5C, the predetermined orientation is an angular orientation between a horizontal orientation and a vertical orientation. The first solar panel 460 has a guide channel 430 defined on a first surface.

At block 1120, a second solar panel 450 is positioned adjacent to the first solar panel 460 in the predetermined orientation. The second solar panel 450 has a projection 440 along a first lateral edge. The projection 440 of the second solar panel 450 is configured to be received within the guide channel 430 of the first solar panel 460 and to space the second solar panel 450 apart from the first solar panel 460 by a predetermined distance. Likewise, the subsequent solar panels 420 and 410 are positioned in the predetermined orientation to form the solar panel array 500, 600, 650.

At block 1130, the second solar panel 450 is coupled to the first solar panel 460 via a first flexible tension member having a length equal to or greater than a height of the second solar panel 450. In the example illustrated in FIG. 9A, an individual flexible member is used to couple two adjacent solar panels to one another, whereas in the example illustrated in FIG. 9B, a single flexible tension member is used to couple all the solar panels of the array 500, 600, 650. The method may also include a step of coupling the foremost or the topmost solar panel 410 to the upper structure 710 using either the flexible tension member 750 (FIG. 9A) or the flexible tension member 760 (FIG. 9B).

Using the above described method to position the plurality of panels, the panels may be conveniently deployed in a safe organized manner. Accordingly, in addition to reducing or eliminating a need for human intervention, the panels may be deployed quickly, efficiently, and cost effectively.

Second Example of Solar Panel Array Including A "Z-fold"

Figure 12A:
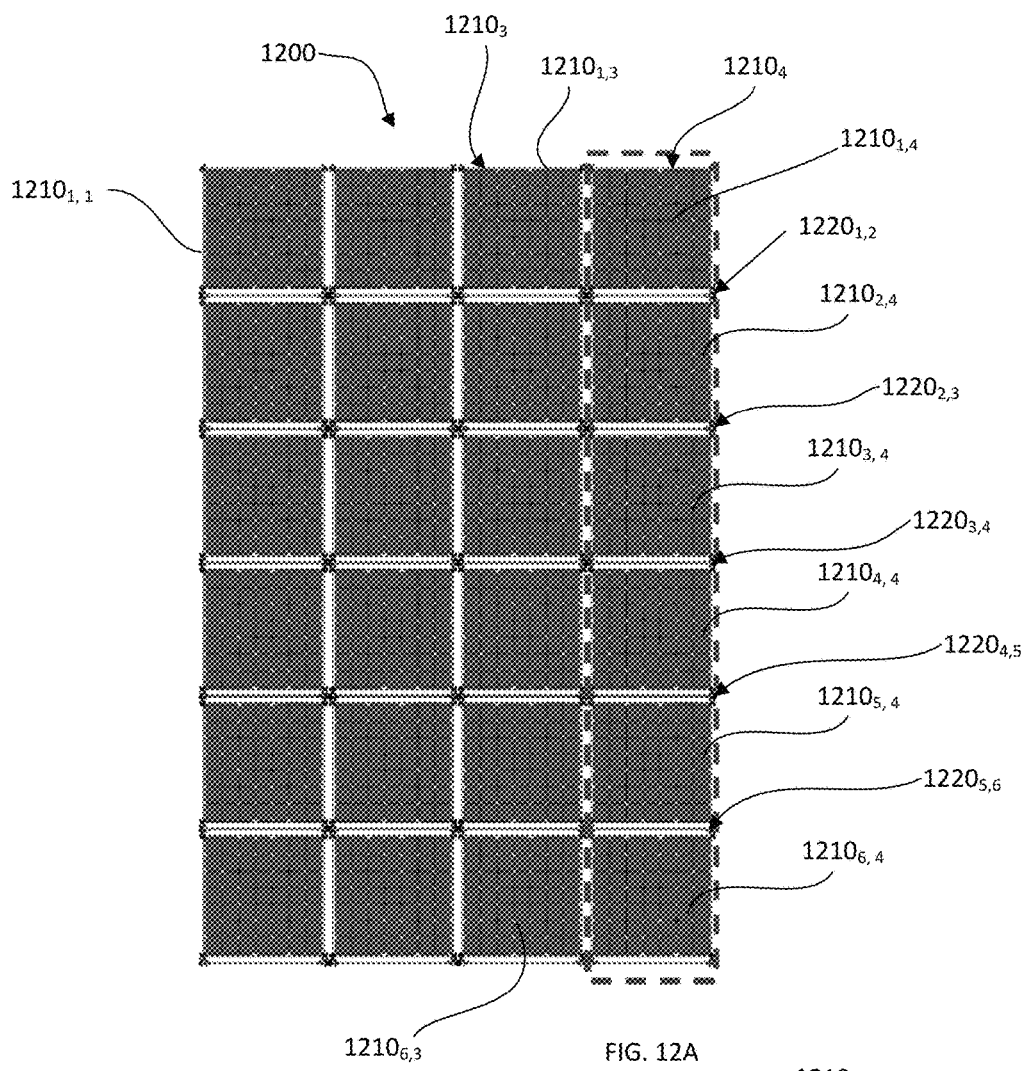
FIG. 12A illustrates a solar panel array in accordance with aspects of the present disclosure.
Figure 12B:
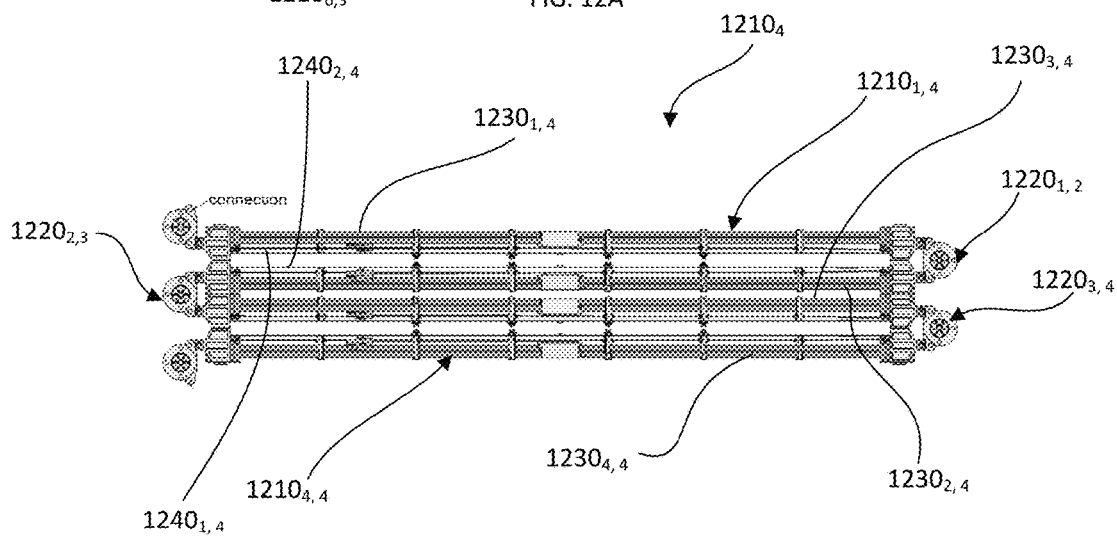
FIG. 12B illustrates a portion of the solar panel array of FIG. 12A in a stacked configuration.

FIG. 12A illustrates another embodiment of a solar panel array 1200. The solar panel array 1200, as illustrated, includes a plurality of rows and columns of solar panels $1210_{x,y}$, in which x denotes the row number and y denotes the column number. While the solar panels $1210_{x,y}$ may be similar to the solar panel 410 described above, it will be understood that the solar panels $1210_{x,y}$ may not include the guide channels 430 and the projections 440. While the illustrated array 1200 includes six rows and four columns of solar panels, it will be understood that other embodiments may include a different number of rows and a different number of columns of solar panels. FIG. 12B illustrates one column or vertical sub-array $1210_4$ of solar panels of the array 1200 in a stacked configuration in a "Z-fold." More particularly, four of the six solar panels $1210_{1,4}$, $1210_{2,4}$, $1210_{3,4}$, $1210_{4,4}$, $1210_{5,4}$ and $1210_{6,4}$ of the vertical sub-array $1210_4$ are shown in a stacked configuration in FIG. 12B. Each pair of two adjacent solar panels is interconnected by a hinge system 1220. In the illustrated embodiment, the solar panels $1210_{1,4}$ and $1210_{2,4}$ are connected to one another by hinge system $1220_{1,2}$, the solar panels $1210_{2,4}$ and $1210_{3,4}$ are connected to one another by hinge system $1220_{2,3}$, and so on.

Each of the solar panels $1210_{1,4}$, $1210_{2,4}$, $1210_{3,4}$, and $1210_{4,4}$, of the vertical sub-array $1210_4$ has a respective frame $1230_{1,4}$, $1230_{2,4}$, $1230_{3,4}$, and $1230_{4,4}$ and a plurality of solar cells collectively labeled as $1240_{1,4}$, $1240_{2,4}$ and so on installed on the corresponding frame. In the illustrated stacked configuration of the vertical sub-array $1210_4$, the solar panels $1210_{1,4}$, $1210_{2,4}$, $1210_{3,4}$, and $1210_{4,4}$ are stacked so as to form a "Z-fold" stack. In the "Z-fold" stack, the solar cells $1240_{1,4}$ of the first solar panel $1210_{1,4}$ face the solar cells $1240_{2,4}$ of the second solar panel $1210_{2,4}$ and the frame $230_{2,4}$ of the second solar panel $1210_{2,4}$ faces the frame $1230_{3,4}$ of the third solar panel $1210_{3,4}$.

Figure 13:
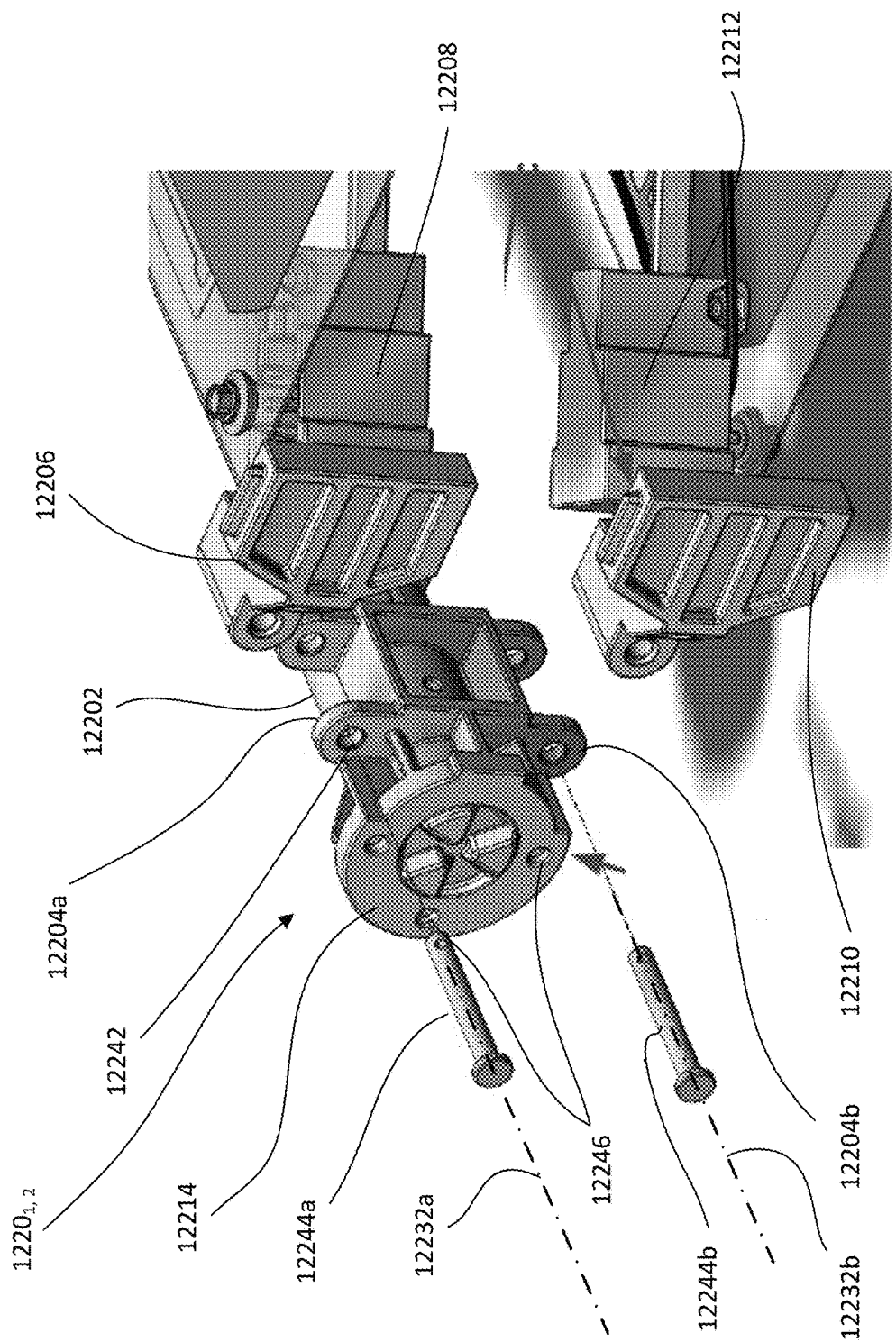
FIG. 13 illustrates an exploded view of a hinge system for connecting two solar panels to one another in accordance with aspects of the present disclosure.
Figure 14:
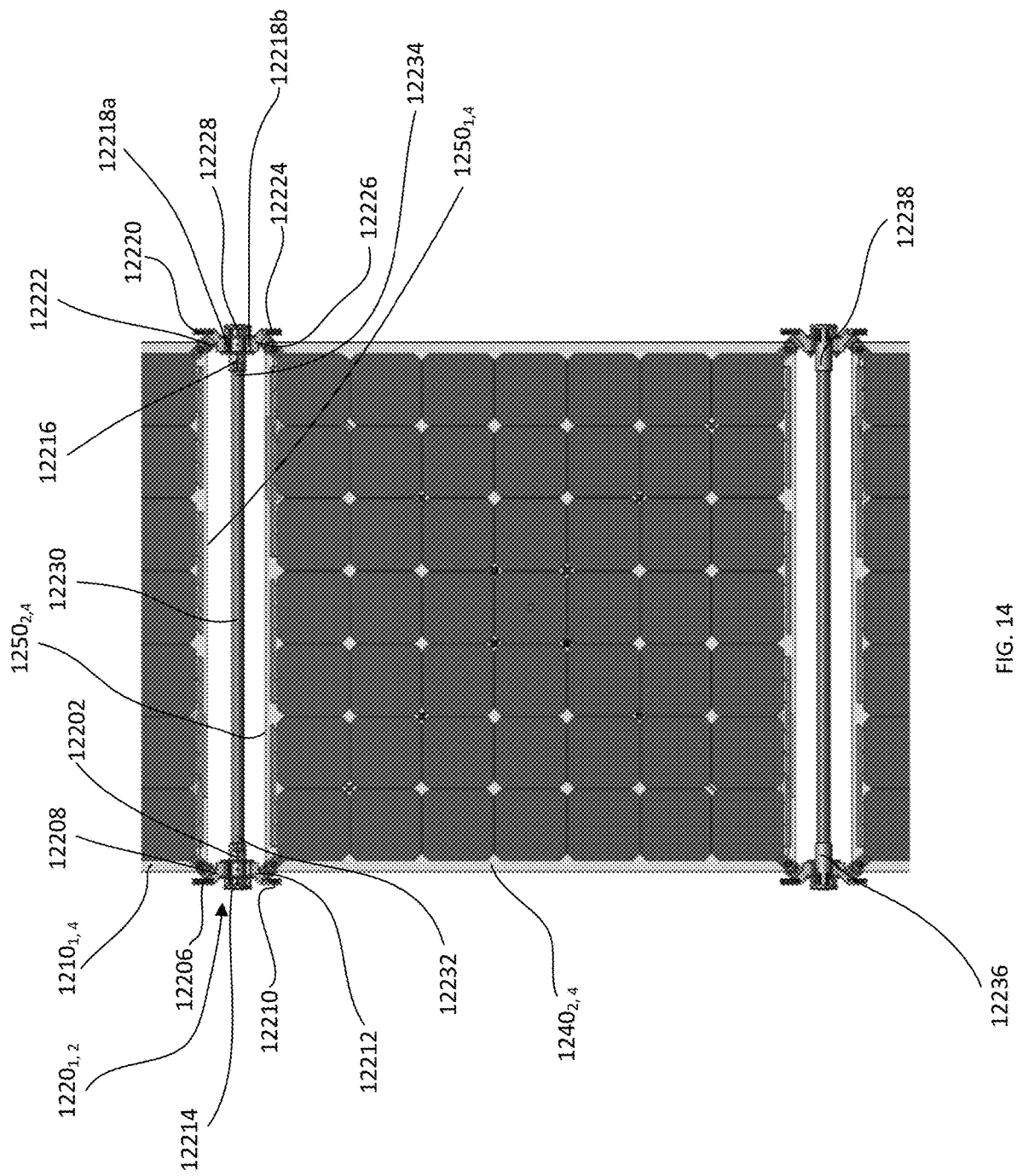
FIG. 14 illustrates a front view of the hinge system of FIG. 13 in a deployed configuration.

Referring now to FIGS. 13 and 14, the hinge system $1220_{1,2}$ is illustrated in an exploded view and a front view, respectively. The hinge system $1220_{1,2}$ includes a first hinge base $1220_2$ connected at first ends of the first solar panel $1210_{1,4}$ and the second solar panel $1210_{2,4}$ and a second hinge base 12216 connected at second ends of the first solar panel $1210_{1,4}$ and the second solar panel $1210_{2,4}$. In the illustrated embodiment, a hinge rod 12230 extends between the first hinge base $1220_2$ and the second hinge base 12216 such that the first solar panel $1210_{1,4}$ and the second solar panel $1210_{2,4}$ are configured to pivot about the first hinge base $1220_2$, the second hinge base 12216 and the hinge rod 12230 about hinge axes 12232a, 12232b, respectively. The hinge rod 12230 is spaced apart from a transverse edge $1250_{1,4}$ of the first solar panel $1210_{1,4}$ and a transverse edge $1250_{2,4}$ of the second solar panel $1210_{2,4}$. The first hinge base 12202 is connected at a first end 12232 of the hinge rod 12230 and the second base 12216 is connected at a second end 12234 of the hinge rod 12230 such that there is no relative translation or rotational movement between the first hinge base 12202 and the hinge rod 12230 or between the second hinge base 12216 and the hinge rod 12230.

In an exemplary embodiment, the hinge rod 12230 may be made of aluminum or composite material such as Carbon Fiber Reinforced Plastic (CFRP). Other suitable metals, preferably light-weight metal or alloys may also be used for manufacturing the hinge rod 12230. While in the illustrated embodiment, the hinge rod 12230 is illustrated as having a generally circular cross-section, it will be understood that the hinge rod 12230 may have other cross-sectional shapes, such as oval, square, polygonal, and composite geometric shapes having keying features and/or flat faces to facilitate assembly. A length of the hinge rod 12230 is generally coextensive with a length of the transverse edges $1250_{1,4}$, $1250_{2,4}$ of the respective solar panels $1210_{1,4}$, $1210_{2,4}$. In an exemplary embodiment, the transverse edges $1250_{1,4}$, $1250_{2,4}$ of the respective solar panels $1210_{1,4}$, $1210_{2,4}$ may have a length of about 0.94 meter (m) and the hinge rod 1230 may have a length of about 1.1 m. The hinge rod 12230 may have a diameter ranging from about 12 millimeters (mm) to about 35 mm, by way of non-limiting examples only. The hinge rod 12230 may of course have other dimensions depending on the requirements of a given application. Still further, different hinge rods within the vertical sub-array $1210_4$ may have different dimensions.

In the illustrated configuration, each of the first hinge base 12202 and the second hinge base 12216 is configured to receive or otherwise secure the corresponding ends 12232 and 12234 of the hinge rod 12230. In one example, the first hinge base 12202 and the second hinge base 12216 may include a first sleeve 12236 and a second sleeve 12238 (labeled in FIG. 14 for another hinge system for the sake of clarity). Each of the first sleeve 12236 and the second sleeve 12238 is configured to receive the respective ends 12232 and 12234 of the hinge rod 12230 therewithin. In one example, the first sleeve 12236 and the second sleeve 12238 further include fasteners 12240 (FIG. 15B) to establish a secured connection between the first and the second sleeves 12236, 12238 and the corresponding ends 12232 and 12234 of the hinge rod 12230. In an exemplary embodiment, the first hinge base 12202 and the second hinge base 12216 may be made of a metal, a plastic material such as nylon or polycarbonate, or a composite material such as CFRP.

In other embodiments, the hinge rod 12230 may be securely connected to the first hinge base 12202 and the second hinge base 12216 using other known methods such as welding, clamping, riveting, bonding, swaging, press-fitting, punching or using fasteners such as screws and bolts.

Still referring to FIGS. 13 and 14, the first hinge base 12202 includes a first bracket feature 12204a and a second bracket feature 12204b. Likewise, the second hinge base 12216 includes a first bracket feature 12218a and a second bracket feature 12218b. The first bracket features 12204a and 12218a may be used for connecting the first hinge base 12202 and the second hinge base 12216, respectively, to the first solar panel $1210_{1,4}$. Likewise, the second bracket features 12204b and 12218b may be used for connecting the first hinge base 12202 and the second hinge base 12216, respectively, to the second solar panel $1210_{2,4}$. The first bracket feature 12204a and the second bracket feature 12204b as well as the first bracket feature 12218a and the second bracket feature 12218b each include apertures 12242 in the illustrated embodiment. The apertures 12242 are configured to receive therewithin pivot pins 12244a, 12244b for the first bracket feature 11204a and the second bracket feature 11204b, respectively. Other bracket features include similar apertures to receive similar pins. In one example, the pivot pins 12244a, 12244b may take the form of a bolt. Such pivot pins are known in the art and therefore are not described in any further detail.

Each of the first hinge base 12202 and the second hinge base 12216 includes a first flange 12214 and a second flange 12228, respectively, in the illustrated embodiment. Each of the first flange 12214 and the second flange 12228 includes a plurality of apertures 12246. The flanges 12214 and 12228 may be used to connect the first vertical sub-array $1210_4$ to an adjacent vertical sub-array $1210_3$, for example, including solar panels $1210_{1,3} \ldots 1210_{6,3}$ in FIG. 12A. Fasteners, for example, bolts and nuts, may be used to securely connect the flanges of adjacent solar panels, using the apertures 12246. In other embodiments, other quick-connect mechanisms may be also to connect adjacent solar panels to one another such as quarter-turn/bayonet locking collar, a snap fit, a canted spring locking mechanism or hose fitting. An advantage of the flanges or other equivalent devices is that vertical sub-arrays containing multiple solar panels, which may be relatively easily transported and handled, may be assembled into a desired configuration including multiple vertical sub-arrays at the deployment location, such as the one illustrated in FIG. 12A. In one example, every flange in the first vertical sub-array $1210_4$ is connected to an adjacent corresponding flange of the second vertical sub-array $1210_3$. In another example, every alternate flange of a first vertical sub-array is connected to an adjacent flange of a second vertical sub-array. In yet another example, only the flanges of the solar panels of the first horizontal row of solar panels of the first vertical sub-array $1210_4$ and the second vertical sub-array $1210_3$ of FIG. 12A and the flanges of the solar panels of the last horizontal row of the solar panels of the first vertical sub-array $1210_4$ and the second vertical sub-array $1210_3$ of FIG. 12A may be connected to another.

Figure 15A:
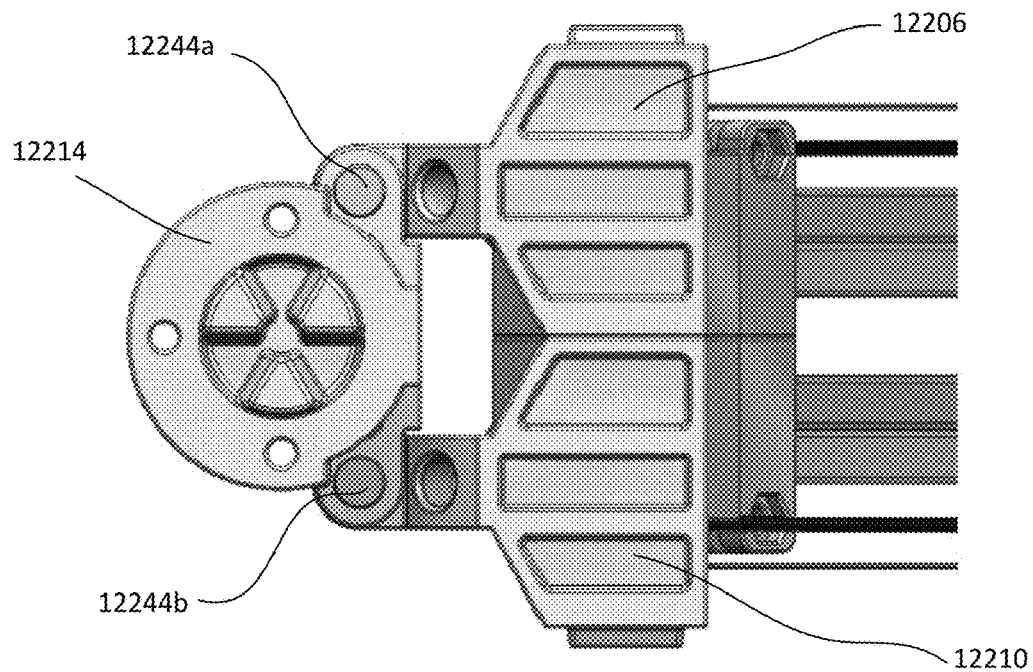
FIGS. 15A-15B illustrate a side view and a top view, respectively, of the hinge mechanism of FIG. 13 in a folded configuration in accordance with aspects of the present disclosure.
Figure 15B:
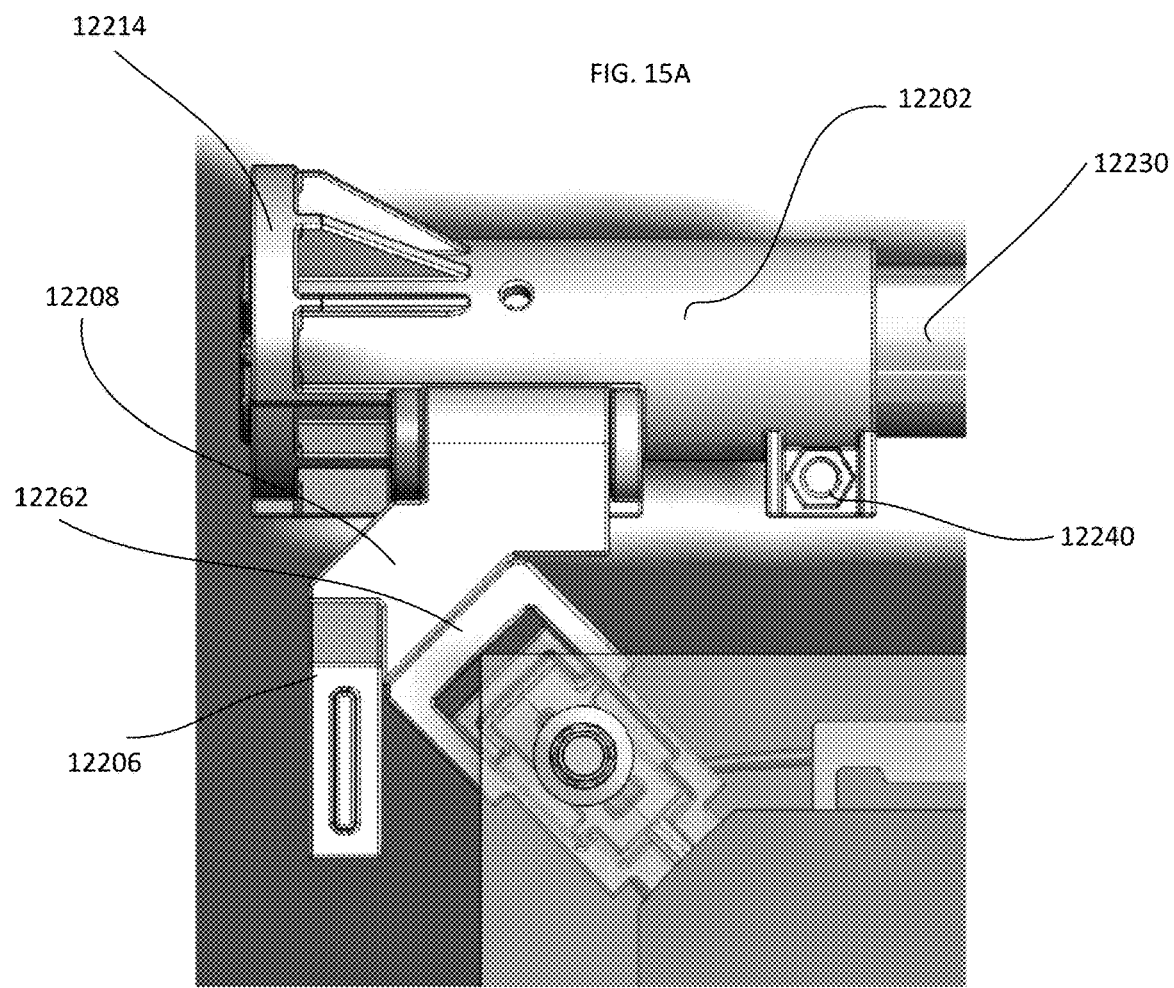

Referring now to FIGS. 14, 15B, and 16A a first top connecting arm 12208 pivotably connects the first solar panel $1210_{1,4}$ to the first bracket feature 2204a about the pivot pin 12244a and a second top connecting arm 12222 pivotably connects the first solar panel $1210_{1,4}$ to the first bracket feature 12218a about a pivot pin (not labeled). Likewise, a first bottom connecting arm 12212 pivotably connects the second solar panel $1210_{2,4}$ to the second bracket feature 12204b about the pivot pin 12244b and a second bottom connecting arm 12226 connects the second solar panel $1210_{2,4}$ about a pivot pin (not labeled). The first top connecting arm 12208 includes a first top alignment feature 12206, the second top connecting arm 12222 includes a second top alignment feature 12220, the first bottom connecting arm 12212 includes a first bottom alignment feature 12210 and the second bottom connecting arm 12226 includes a second bottom alignment feature 12224. Each of the connecting arms further includes an attachment for connecting the connecting arm to the solar panel. For example, FIG. 15B illustrates an attachment 12262 associated with the first top connecting arm 12208 and the first solar panel $1210_{1,4}$. In one example, the first top connecting arm 12208 and the attachment 12262 may form a unitary structure, which may be attached to solar panel using any of the known methods such as press-fitting, clamping, riveting, bonding, or using fasteners.

While one pair of alignment features 12206 and 12210 will be described in further detail below, other pairs of alignment features may have similar construction. The first top alignment feature 12206 includes a first mating surface 12252 and a second mating surface 12250. Similarly, the first bottom alignment feature 12210 includes a first mating surface 12254 and a second mating surface 12256. The second mating surface 12250 of the first top alignment feature 12206 includes a cavity 12258 whereas the first mating surface 12254 of the first bottom alignment feature 12210 includes a projection or a rib 12260. The cavity 12258 and the projection 12260 are complementary to one another such that the projection 12260 is snugly received into the cavity 12258 when the mating surfaces 12250 and 12252 mate with one another. While the rib or projection 12260 is illustrated as being generally linear and rectangular in cross-section, it will be understood that the rib or projection 12260 may have different shapes and/or cross-sections such as circular, cylindrical, spherical, oval, and polygonal, by way of non-limiting examples only, and the cavity 12258 may have corresponding shape to accommodate the projection 12260. In some examples, the cavity 12258 may not have an exact complementary shape relative to the rib or projection 12260. For instance, while the rib or projection 12260 may have a generally semi-circular cross-section, the cavity 12258 may take the form of a V-shaped groove sized to accommodate the projection 12260. An advantage of such a pairing may be a greater degree of tolerance for a degree of misalignment between the alignment features 12206 and 12210.

In the illustrated embodiment, the mating surfaces of the alignment features 12206 and 12210 are generally planar and are oriented horizontally when the solar panel array is in the Z-fold stacked configuration as shown in FIGS. 12B, 15A. In another embodiment, the mating surfaces may be inclined or tapered, for example, such that an incline or a taper of a first mating surface of a bottom alignment feature is complementary to an incline or a taper of a second mating surface of a top alignment feature.

In yet another embodiment, the mating surfaces of the alignment features 12206 and 12210 may not be planar. For instance, the mating surfaces of the alignment features 12206 and 12210 may have a wavy profile or a sawtooth profile, by way of non-limiting examples only. In one example, the mating surfaces of the alignment features 12206 and 12210 may be sinusoidal such that a first mating surface of a bottom alignment feature is complementary to a second mating surface of a top alignment feature.

Referring to FIG. 12B, the first and second alignment features 12206 and 12210 are so configured that when the first and second solar panels $1210_{1,4}$ and $1210_{2,4}$ are in a stacked configuration, the first and second solar panels $1210_{1,4}$ and $1210_{2,4}$ are spaced apart from another by a predetermined distance. The predetermined distance may range from about 25 mm to about 75 mm. A height of the alignment features 12206, 12210 is a function of the height of the solar panel 1210. In one example, the alignment features 12206, 12210 may have a height from about 2 mm to about 6 mm, while the height of the solar panel 1210 may range from about 25 mm to about 75 mm. An advantage of this configuration may be that neither the solar cells of one solar panel are in contact with the solar cells of the adjacent solar panel nor the frame of one solar panel is in contact with the frame of the adjacent solar panel. As can be seen in FIG. 12B, the solar cells $1240_{1,4}$ of the first solar panel $1210_{1,4}$ are spaced apart from the solar cells $1240_{2,4}$ of the second solar panel $1210_{2,4}$. Likewise, the frame $1230_{2,4}$ of the second solar panel $1210_{2,4}$ is spaced apart from the frame $1230_{3,4}$ of the third solar panel $1210_{3,4}$.

In one example, each of the connecting arms 12208, 12112 and the associated alignment features 12206, 12210 may be integrally manufactured as a single component. For example, the connecting arms 12208, 12112 and the associated alignment features 12206, 12210 are made from material such as a metal, a metal alloy, a plastic such as nylon or polycarbonate, or a composite material such as CFRP, using for example, injection molding, and other suitable processes.

Figure 17C:
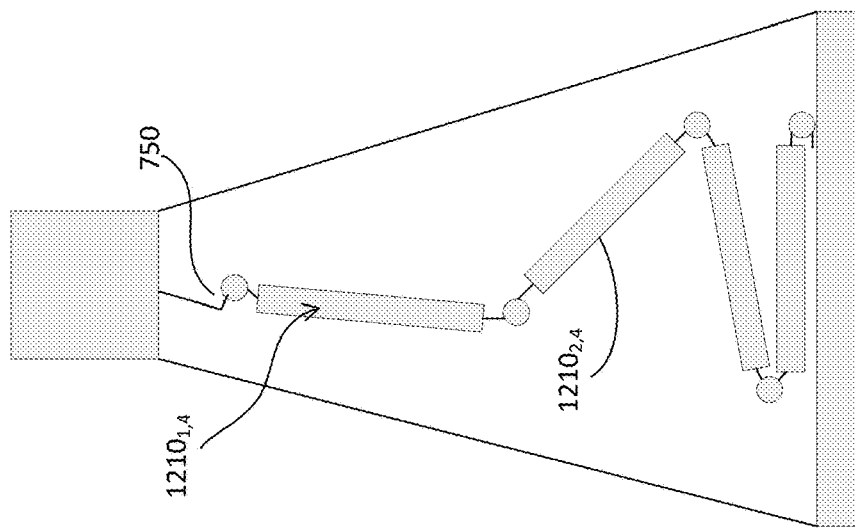
FIGS. 17A-17C schematically illustrate various stages of deployment of the solar panels of FIG. 12B in side views in accordance with aspects of the present disclosure.
Figure 17B:
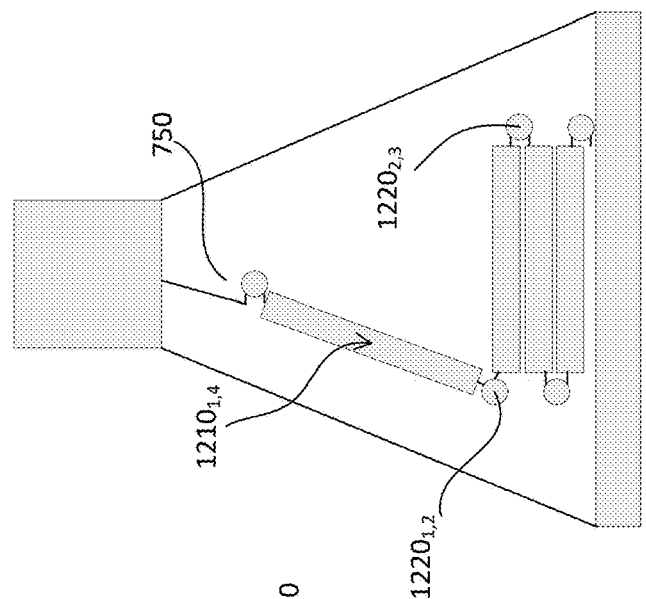
Figure 17A:
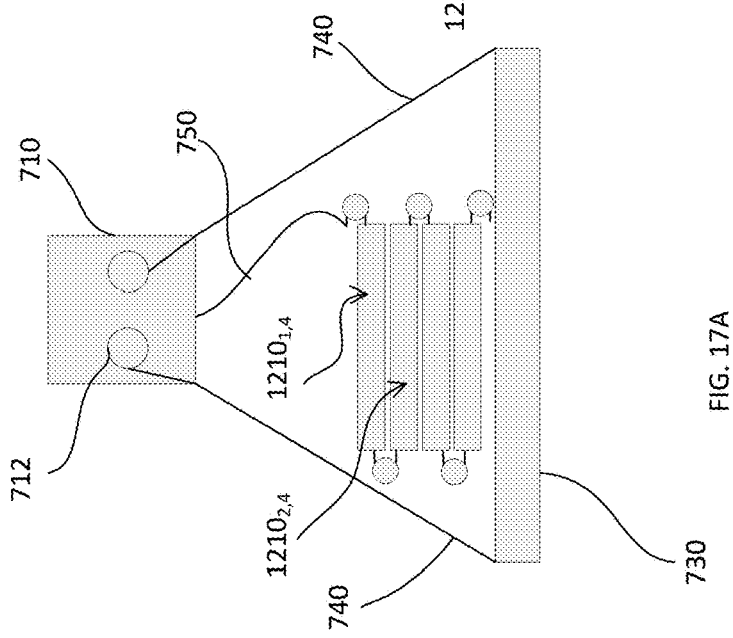

Referring now to FIGS. 17A-17C, various stages of deployment of the solar panels 1200 will be described. In an initial stage illustrated in FIG. 17A, the solar panels $1210_{1,4}$, $1210_{2,4}$, . . . are stacked in an array 1200. While FIGS. 17A-17C illustrate only the last vertical solar panel sub-array $1210_4$ of the array 1200, it will be understood that the array may include more than one vertical sub-arrays, for example, as illustrated in FIG. 12A. The array $1210_4$ rests on the platform 730. The platform 730 is coupled to the upper structure 710 via tension elements 740. In an example, each tension element 740 may be wound on a spool element 712 in the upper structure 710. When the spool element 712 rotates in a clockwise direction, the tension element 740 may be pulled upwards and wound on the spool 712, thereby pulling the platform 730 towards the upper structure 710. On the other hand, when the spool element 712 rotates in a counterclockwise direction, the tension element 740 may be released from the spool 712, and the platform 730 may move away from the upper structure 730, for example, when acted upon by gravitational forces. Of course, in other examples, the directions of rotation of the spools may be reversed for the ascent and descent of the platform 730 relative to the upper structure 710. In one example, the spool 712 includes a torsional damper (not shown) to control the rotational speed of the spool, and thereby, the rate of descent of the platform 730 relative to the upper structure 710.

The topmost or foremost solar panel $1210_{1,4}$ is coupled to the upper structure 710 via the flexible tension member 750. In one example, the topmost or foremost solar panel of each of the vertical sub-array may be coupled to the flexible tension member 750. In another example, only the topmost or foremost solar panel of the first vertical sub-array and the last vertical sub-array of the array 1200 may be coupled to the flexible tension member 750. The flexible tension member 750 has a length corresponding to a desired distance of the topmost solar panel $1210_{1,4}$ from the upper structure 710, when the solar panel $1210_{1,4}$ is fully deployed. Each subsequent solar panel $1210_{2,4}$, $1210_{3,4}$, . . . is coupled to the preceding solar panel via a corresponding hinge system, for example, $1220_{1,2}$, $1220_{2,3}$, as described above. In one example, the flexible tension member coupled to the last solar panel in the array may be connected to the lower platform 730 or the lower structure 720.

In a subsequent stage, when the balloon 200 has reached a predetermined altitude, the lower platform 730 may be allowed to descend relative to the upper structure via the tension elements 740. The spools 712 may be rotated in a counterclockwise direction in the illustrated example to permit the platform 730 to descend relative to the upper structure 710. As soon as the platform 730 has descended by a distance greater than the length of the flexible tension member 750, the flexible tension member 750 may become taut and arrest the descent of the topmost solar panel $1210_{1,4}$, while the rest of the array 1200 and the platform 730 continue their descent.

As the tension elements 740 are further released from the spools 712, the platform 730 may continue its descent relative to the upper structure 710. When the platform 730 has descended by a distance greater than the length of the first solar panel $1210_{1,4}$, the associated hinge system $1220_{1,2}$ may arrest the descent of the adjacent solar panel $1210_{2,4}$, while the rest of the array 1200 and the platform 730 may continue their descent. At this stage, the topmost solar panel $1210_{1,4}$ may be in a nearly vertical, deployed position, held by the flexible tension member 750 and the adjacent solar panel $1210_{2,4}$ may be nearly deployed, held by the hinge system $1220_{1,2}$. As the platform 730 continues its descent, the remaining solar panels may be deployed in a similar fashion. Thus, the deployment of the solar panels may be achieved primarily using gravity.

In another example, instead of the platform 730 moving downward relative to the upper structure 710, the upper structure 710 may be moved upward relative to the platform 730. The solar panels of the array 1200 would deploy in essentially the same manner as described above, with the foremost or the topmost solar panel $1210_{1,4}$ being lifted off the stack 1200 as the upper structure 710 moves upward via the flexible tension member 750 and each subsequent solar panel of the stack 1200 being lifted off the stack as the upper structure 710 continues its ascent.

Second Exemplary Method for Forming a Solar Panel Array—"Z-Fold" Configuration

Figure 18:
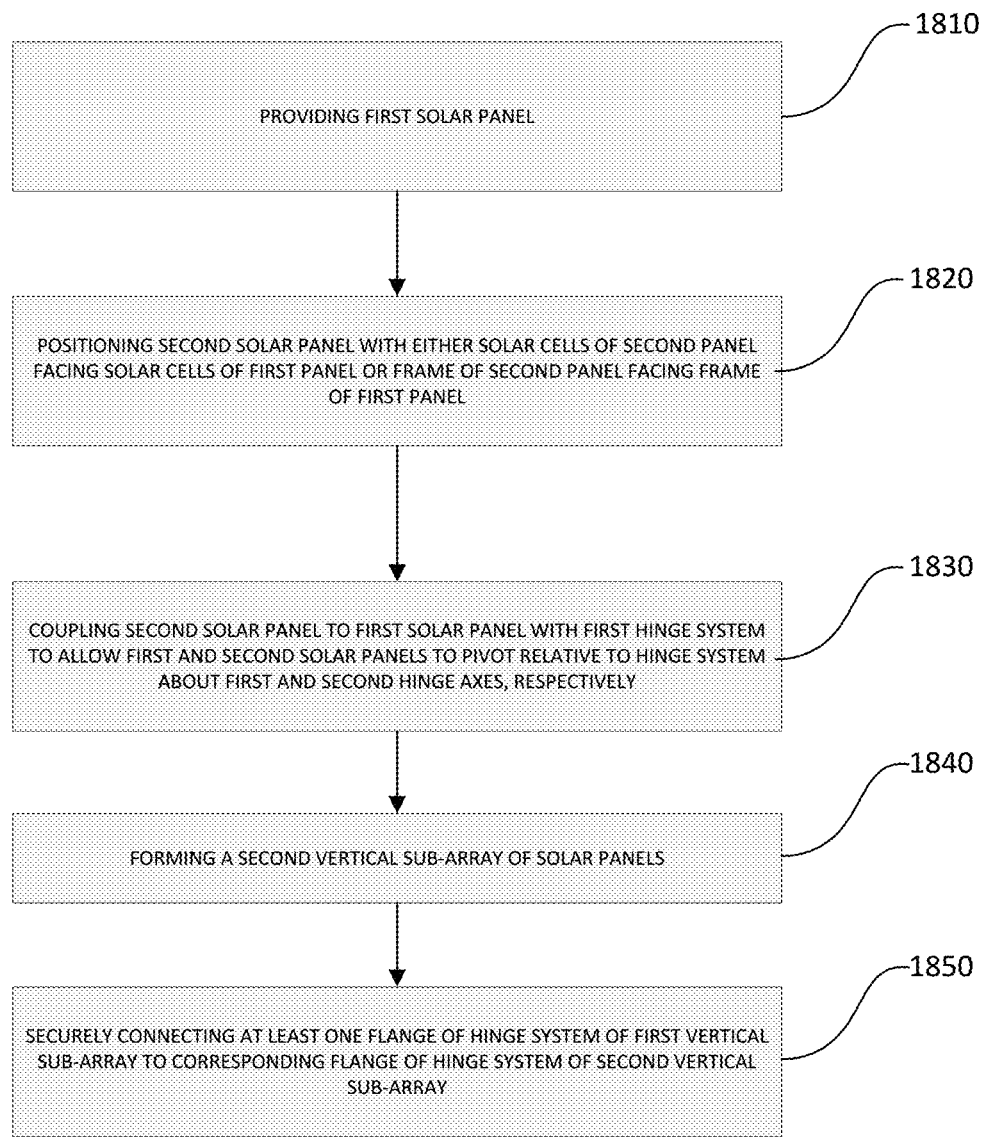
FIG. 18 is a flow-chart for forming a solar panel array of FIG. 12A in accordance with aspects of the present invention.

FIG. 18 is a flow chart for forming a solar panel array 1200 of FIG. 12A. At block 1810, a first solar panel $1210_{1,4}$ is provided. At block 1820, a second solar panel $1210_{2,4}$ is positioned adjacent to the first solar panel $1210_{1,4}$ with either the solar cells $1240_{2,4}$ of the second solar panel $1210_{2,4}$ facing the solar cells $1240_{1,4}$ of the first solar panel $1210_{1,4}$ or the frame $1230_{2,4}$ of the second solar panel $1210_{2,4}$ facing the frame $1230_{1,4}$ of the first solar panel $1210_{1,4}$. At block 1830, the second solar panel $1230_{2,4}$ is coupled to the first solar panel $1230_{1,4}$ using a first hinge system $1220_{1,2}$ so as to allow the first solar panel $1210_{1,4}$ and the second solar panel $1210_{2,4}$ to pivot about the first hinge system $1220_{1,2}$ about the first hinge axis 12232a and the second hinge axis 12232b, respectively. Thus, a first vertical sub-array $1210_4$ of solar panels $1210_{1,4}$, $1210_{2,4}$ is formed.

Optionally, a second vertical sub-array $1210_3$ of solar panels $1210_{1,3}$, $1210_{2,3}$ . . . $1210_{6,3}$ may be formed in a similar manner at block 1840. At block 1850, at least one flange of the hinge system of the first vertical sub-array $1210_4$ is securely connected to a corresponding flange of the hinge system of the second vertical sub-array $1210_3$. Thus, the solar panel array 1200 of FIG. 12A may be formed by connecting two or more multiple vertical sub-arrays of solar panels.

Most of the foregoing and the following alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of forming a solar array for an atmospheric balloon, the method comprising:
    providing a first solar panel;
    positioning a second solar panel adjacent to the first solar panel such that either solar cells of the second solar panel face solar cells of the first solar panel or a frame of the second solar panel faces a frame of the first solar panel;
    coupling the second solar panel to the first solar panel using a hinge system so as to allow the first and the second solar panels to pivot relative to the hinge system about a first hinge axis and a second hinge axis, respectively, thereby forming a first vertical sub-array of solar panels; and
    wherein coupling the second solar panel to the first solar panel with the hinge system includes:
        pivotally coupling first and second connecting arms coupled to the first solar panel to a first hinge base and a second hinge base, respectively, the first connecting arm coupled to the first hinge base with a first pivot pin and the second connecting arm coupled to the second hinge base with a second pivot pin; and
        pivotally coupling third and fourth connecting arms coupled to the second solar panel to the first hinge base and the second hinge base, respectively, the third connecting arm coupled to the first hinge base with a third pivot pin and the fourth connecting arm coupled with the second hinge base with a fourth pivot pin.

2. The method of claim 1, further comprising:
    forming a second vertical sub-array of solar panels;
    positioning the second vertical sub-array adjacent the first vertical sub-array; and
    securely connecting a first hinge system of the first vertical sub-array to a first hinge system of the second vertical sub-array.

3. The method of claim 2, wherein securely connecting a first hinge system of the first vertical sub-array to a first hinge system of the second vertical sub-array comprises connecting at least one flange of the first hinge system of the first vertical sub-array to a corresponding flange of the first hinge system of the second vertical sub-array.

4. The method of claim 2, wherein a number of solar panels in the first vertical sub-array of solar panels is equal to a number of solar panels in the second vertical sub-array of solar panels.

5. The method of claim 2, wherein the first vertical sub-array of solar panels and second vertical sub-array of solar panels are configured to be in a Z-fold stacked configuration.

6. The method of claim 1, wherein the first and third connecting arms are coupled to a first bracket feature of the first hinge base and a second bracket feature of the first hinge base, respectively.

7. The method of claim 6, wherein the second and fourth connecting arms are coupled to a first bracket feature of the second hinge base and a second bracket feature of the second hinge base, respectively.

8. The method of claim 1, wherein each of the first and second connecting arms coupled with the first and second hinge bases comprises an alignment feature configured to align the first and second solar panels when in a stacked configuration so as to maintain a predetermined distance between the first and second solar panels.

* * * * *